United States Patent
Morikawa

(10) Patent No.: US 10,462,332 B2
(45) Date of Patent: Oct. 29, 2019

(54) IMAGE PROCESSING APPARATUS GENERATING PROFILE MAPPING A PLURALITY OF INPUT VALUES TO RESPECTIVE ONES OF A PLURALITY OF OUTPUT VALUES

(71) Applicant: BROTHER KOGYO KABUSHIKI KAISHA, Nagoya, Aichi (JP)

(72) Inventor: Shota Morikawa, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/222,126

(22) Filed: Dec. 17, 2018

(65) Prior Publication Data

US 2019/0199888 A1 Jun. 27, 2019

(30) Foreign Application Priority Data

Dec. 21, 2017 (JP) ................................ 2017-244876

(51) Int. Cl.
| | | |
|---|---|---|
| H04N 1/60 | (2006.01) | |
| G06K 15/02 | (2006.01) | |
| G06K 15/10 | (2006.01) | |
| G06K 15/00 | (2006.01) | |

(52) U.S. Cl.
CPC .......... *H04N 1/6019* (2013.01); *G06K 15/102* (2013.01); *G06K 15/1802* (2013.01); *G06K 15/407* (2013.01)

(58) Field of Classification Search
CPC combination set(s) only.
See application file for complete search history.

(56) References Cited

FOREIGN PATENT DOCUMENTS

| JP | 2010-098527 A | 4/2010 |
|---|---|---|
| JP | 2010-141828 A | 6/2010 |

*Primary Examiner* — Christopher Wait
(74) *Attorney, Agent, or Firm* — Scully, Scott, Murphy & Presser, PC

(57) ABSTRACT

In an image processing apparatus, a processor acquires first and second profiles. The processor generates a third profile. The processor acquires a first boundary defining a first boundary value. The processor determines a second boundary by using first and second boundary output values. The second boundary defines a second boundary value. The first boundary output value is determined from output values in the first profile on the basis of the first boundary. The second boundary output value is determined from output values in the second profile on the basis of the first boundary. The first and second boundary values define first, second, and third ranges. The third profile maps a specific input value in the second range to an output value by using a value to which the first profile maps the specific input value and a value to which the second profile maps the specific input value.

19 Claims, 13 Drawing Sheets

FIG. 3

| R | G | B | CMY PROFILE PF1 | | | CMYK PROFILE PF2 | | | | ΔCL |
|---|---|---|---|---|---|---|---|---|---|---|
|   |   |   | C | M | Y | C | M | Y | K |   |
| 0 | 0 | 0 | 136 | 190 | 151 | 0 | 0 | 0 | 255 | 377 |
| 16 | 16 | 16 | 116 | 145 | 107 | 22 | 22 | 29 | 229 | 287 |
| 32 | 32 | 32 | 100 | 117 | 82 | 40 | 39 | 52 | 202 | 226 |
| 48 | 48 | 48 | 89 | 101 | 71 | 44 | 42 | 51 | 167 | 183 |
| 64 | 64 | 64 | 79 | 86 | 61 | 44 | 40 | 45 | 115 | 129 |
| 80 | 80 | 80 | 69 | 74 | 53 | 40 | 37 | 39 | 82 | 95 |
| 96 | 96 | 96 | 58 | 60 | 45 | 32 | 30 | 31 | 60 | 73 |
| 112 | 112 | 112 | 49 | 49 | 38 | 28 | 25 | 27 | 40 | 52 |
| 128 | 128 | 128 | 40 | 39 | 31 | 24 | 21 | 23 | 28 | 37 |
| 144 | 144 | 144 | 32 | 31 | 26 | 22 | 19 | 20 | 15 | 22 |
| 160 | 160 | 160 | 24 | 23 | 20 | 20 | 18 | 17 | 3 | 7 |
| 176 | 176 | 176 | 19 | 17 | 16 | 19 | 17 | 16 | 0 | 0 |
| 192 | 192 | 192 | 15 | 13 | 12 | 15 | 13 | 12 | 0 | 0 |
| 208 | 208 | 208 | 11 | 9 | 9 | 11 | 9 | 9 | 0 | 0 |
| 224 | 224 | 224 | 6 | 5 | 5 | 6 | 5 | 5 | 0 | 0 |
| 240 | 240 | 240 | 3 | 3 | 3 | 3 | 3 | 3 | 0 | 0 |
| 256 | 256 | 256 | 0 | 0 | 0 | 0 | 0 | 0 | 0 | 0 |

Es

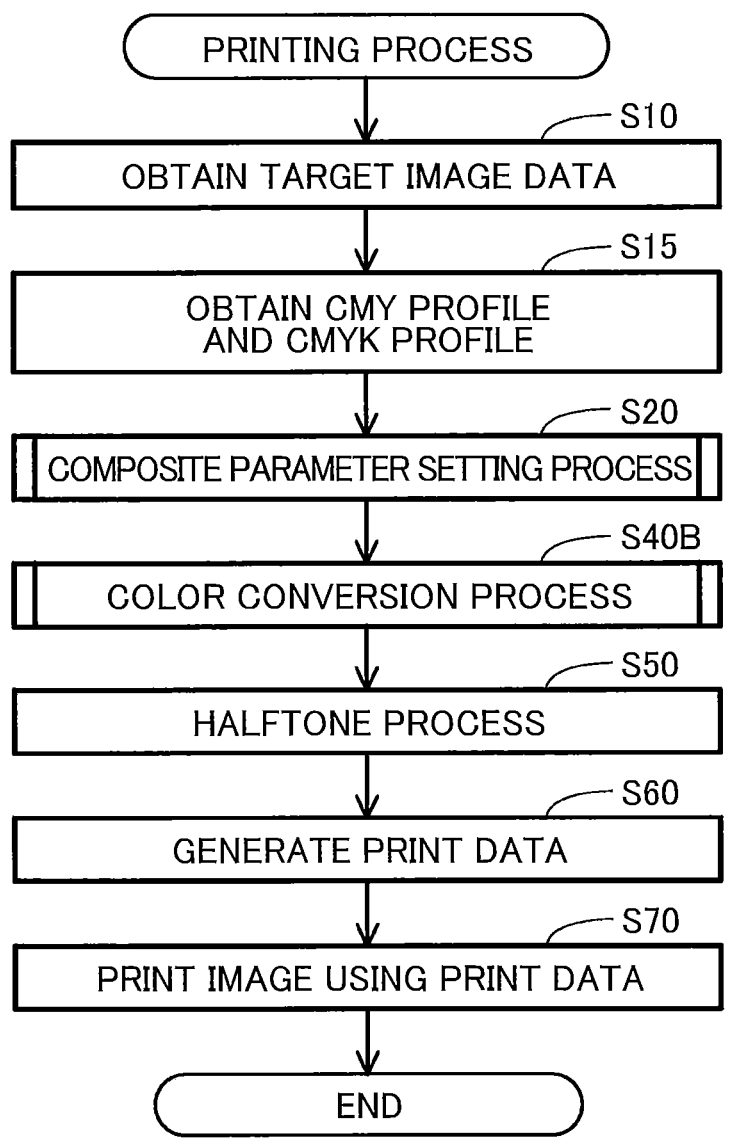

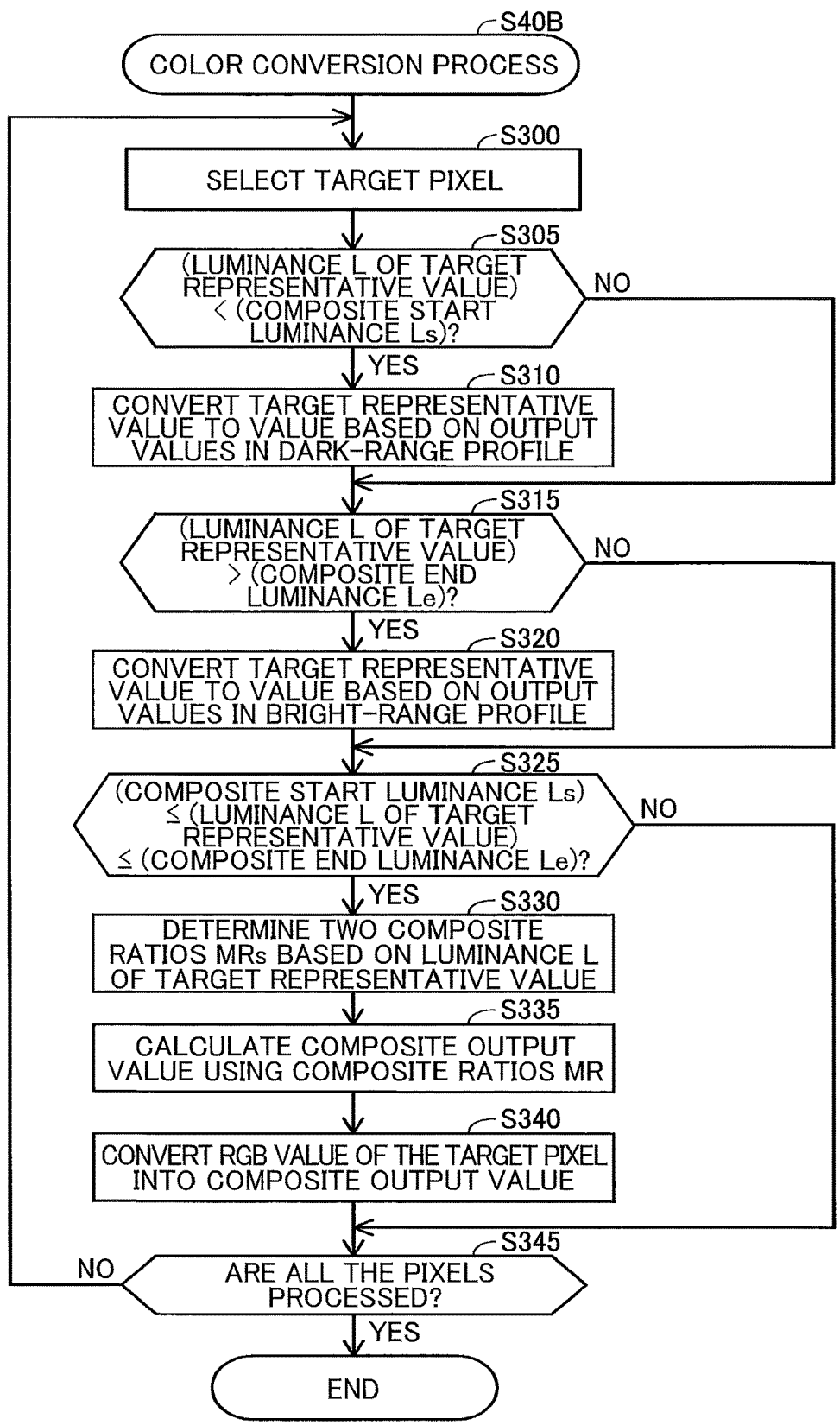
FIG. 11 SECOND EMBODIMENT

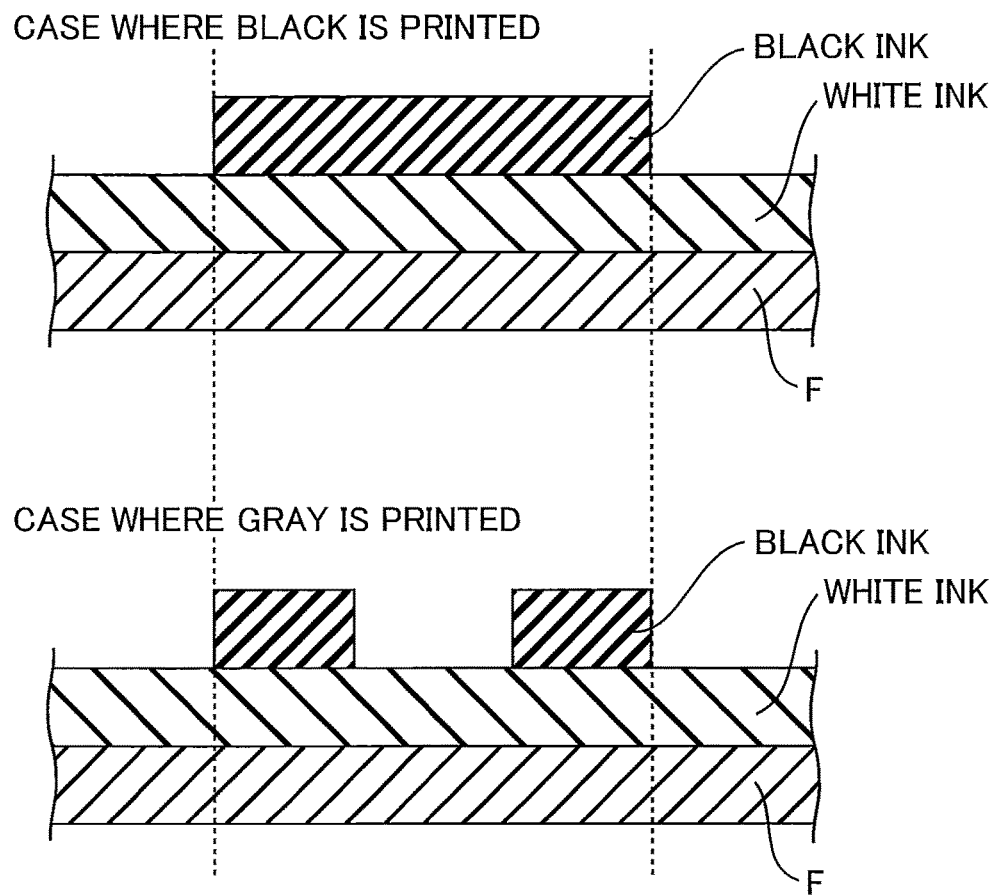

FIG. 12B
PRINTING USING BLACK-FABRIC PROFILE
CASE WHERE BLACK IS PRINTED
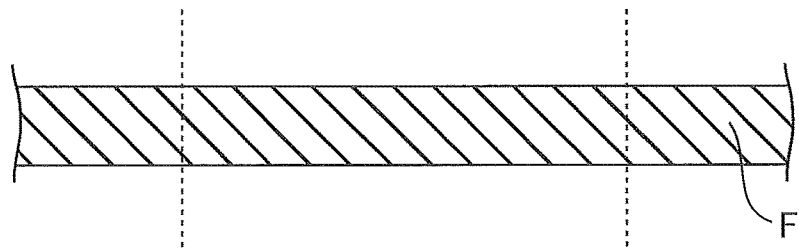
CASE WHERE GRAY IS PRINTED
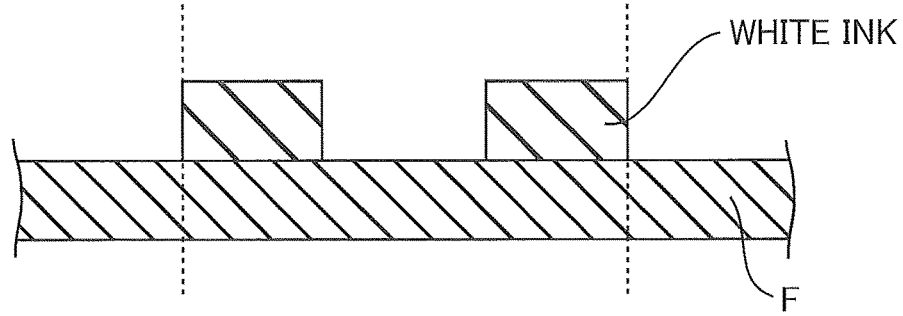
FIG. 13
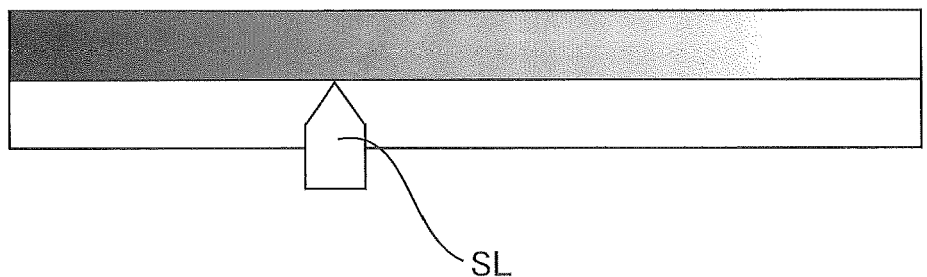
COMPOSITE START LUMINANCE Ls

IMAGE PROCESSING APPARATUS GENERATING PROFILE MAPPING A PLURALITY OF INPUT VALUES TO RESPECTIVE ONES OF A PLURALITY OF OUTPUT VALUES

CROSS REFERENCE TO RELATED APPLICATION

This application claims priority from Japanese Patent Application No. 2017-244876 filed Dec. 21, 2017. The entire content of the priority application is incorporated herein by reference.

TECHNICAL FIELD

The present disclosure relates to a technique for using a plurality of profiles when printing with different types of color materials.

BACKGROUND

A known printer is capable of printing an image by using a cyan ink C, a magenta ink M, a yellow ink Y, a black ink K, a light black ink Lk, a light light black ink LLk, a red ink R, and a blue ink B. The printer generates a new lookup table (LUT) from two types of LUTs. One LUT maps RGB color values to respective CMYKLkLLk color values. The other LUT maps the RGB color values to respective CMYKRB color values. The printer synthesizes these two LUTs at a composite ratio α to generate the new LUT. The generated new LUT maps the RGB color values to respective CMYKLkLLkRB color values. The composite ratio α is determined on the basis of a distance between a gray line in an RGB color space and a grid point whose data is a target of the synchronization.

The printer also generates a LUT capable of reducing the consumption of an ink with the small remaining amount. To generate this LUT, the printer synthesizes a normal LUT prioritizing the image quality and another LUT having a small output value for a color of the ink with the small remaining amount. In this case, the remaining amount of this ink is used as a parameter to determine the composite ratio α.

SUMMARY

There is a need for a technique for printing an image with sufficient quality using a plurality of profiles, such as LUTs, when printing with different types of color materials.

The disclosure provides a technique capable of printing an image with sufficient quality using a plurality of profiles when printing with a plurality of types of color materials.

In order to attain the above and other objects, the disclosure provides an image processing apparatus. The image processing apparatus includes a processor configured to perform: acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; and generating a third profile mapping a plurality of third input values to respective ones of a plurality of third output values. The generating includes: acquiring a first boundary defining a first boundary value, the first boundary value being represented in the specific color space; and determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value. The third profile is generated so that: when a specific input value is in the first range, the third profile maps the specific input value to a third output value equal to an output value to which the first profile maps the specific input value; when a specific input value is in the third range, the third profile maps the specific input value to a third output value equal to an output value to which the second profile maps the specific input value; and when a specific input value is in the second range, the third profile maps the specific input value to a third output value by using an output value to which the first profile maps the specific input value and an output value to which the second profile maps the specific input value.

According to another aspect, the disclosure provides an image processing apparatus. The image processing apparatus includes a processor configured to perform: acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; acquiring target image data including a plurality of color values in the specific color space for representing a target image; and generating print data based on the target image data by using a color conversion process. The generating includes: acquiring a first boundary defining a first boundary value, the first boundary value being represented in the specific color space; and determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value. The color conversion process includes: a first conversion process in which, when a color value is in the first range, the color value is converted to an output value based on a first output value to which the first profile maps a first input value within a prescribed range from the color value; a second conversion process in which, when a color value is in the third range, the color value is converted to an output value based on a second output value to which the second profile maps a second input value within the prescribed range from the color value; and a third conversion process in which, when a color value is in the second range, the color value is converted to an output value by using a first output value to which the first profile maps a first input value within the prescribed range from the color value and a second output value to which the second profile maps a second input value within the prescribed range from the color value.

According to still another aspect, the disclosure provides a non-transitory computer readable storage medium storing a set of program instructions for installed on and executed by a computer. The set of program instructions includes: acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; and generating a third profile mapping a plurality of third input values to respective ones of a plurality of third output values. The generating includes: acquiring a first boundary defining a first boundary value, the first boundary value being represented in the specific color space; and determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value. The third profile is generated so that: when a specific input value is in the first range, the third profile maps the specific input value to a third output value equal to an output value to which the first profile maps the specific input value; when a specific input value is in the third range, the third profile maps the specific input value to a third output value equal to an output value to which the second profile maps the specific input value; and when a specific input value is in the second range, the third profile maps the specific input value to a third output value by using an output value to which the first profile maps the specific input value and an output value to which the second profile maps the specific input value.

According to still another aspect, the disclosure provides a non-transitory computer readable storage medium storing a set of program instructions for installed on and executed by a computer. The set of program instructions includes: acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; acquiring target image data including a plurality of color values in the specific color space for representing a target image; and generating print data based on the target image data by using a color conversion process. The generating includes: acquiring a first boundary defining a first boundary value, the first boundary value being represented in the specific color space; and determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value. The color conversion process includes: a first conversion process in which, when a color value is in the first range, the color value is converted to an output value based on a first output value to which the first profile maps a first input value within a prescribed range from the color value; a second conversion process in which, when a color value is in the third range, the color value is converted to an output value based on a second output value to which the second profile maps a second input value within the prescribed range from the color value; and a third conversion process in which, when a color value is in the second range, the color value is converted to an output value by using a first output value to which the first profile maps a first input value within the prescribed range from the color value and a second output value to which the second profile maps a second input value within the prescribed range from the color value.

BRIEF DESCRIPTION OF THE DRAWINGS

The particular features and advantages of the disclosure as well as other objects will become apparent from the following description taken in connection with the accompanying drawings, in which:

FIG. 3 is an explanation diagram illustrating a part of a CMY profile and a CMYK profile according to the first embodiment;

FIG. 10 is a flowchart illustrating a printing process according to a second embodiment;

FIG. 11 is a flowchart illustrating a color conversion process according to the second embodiment;

FIG. 12A is an explanation diagram illustrating a printed fabric using a normal profile;

FIG. 12B is an explanation diagram illustrating a printed fabric using a black-fabric profile; and FIG. 13 is a schematic diagram illustrating slider according to a modification (3-2).

DETAILED DESCRIPTION

A. First Embodiment

A-1: Configurations of Image Processing Apparatus

Figure 1:
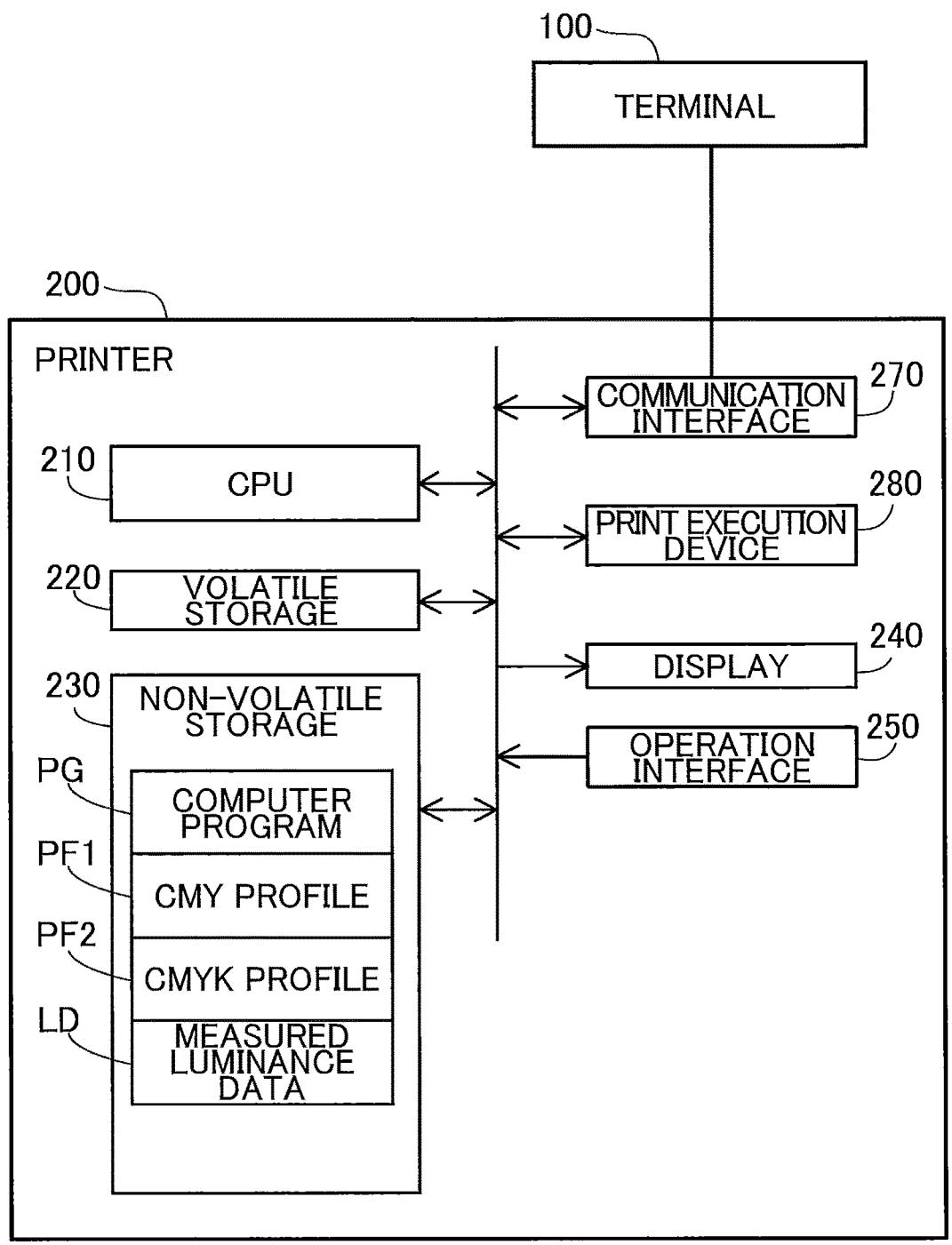
FIG. 1 is a block diagram illustrating configurations of a terminal and a printer according to a first embodiment.

A first embodiment will be described below. FIG. 1 is a block diagram illustrating configurations of a terminal 100 and a printer 200 according to the first embodiment.

The printer 200 includes a CPU 210, a volatile storage 220 such as a RAM, a non-volatile storage 230 such as a hard disk drive or a flash memory, a display 240, an operation interface 250, a communication interface (IF) 270, and a print execution device 280. The CPU 210 is an example of a controller of the printer 200. The display 240 includes a liquid crystal display. The operation interface 250 includes a button and a touch panel superimposed over a liquid crystal panel. The communication interface 270 is a universal serial bus (USB) interface, a wired local-area network (LAN) interface, and/or an IEEE 802.11 wireless interface, for example. Through the communication interface 270, the printer 200 can communicate with an external apparatus such as the terminal 100.

The volatile storage 220 includes a buffer to temporarily store various types of intermediate data generated during the CPU 210 processing. The non-volatile storage 230 stores a computer program PG, a CMY profile PF1, a CMYK profile PF2, and measured luminance data LD. The volatile storage 220 and the non-volatile storage 230 are internal memories of the printer 200.

The computer program PG, the CMY profile PF1, the CMYK profile PF2, and the measured luminance data LD may be stored in the non-volatile storage 230 during the production of the printer 200. Alternatively, the computer program PG, the CMY profile PF1, the CMYK profile PF2, and the measured luminance data LD may be downloaded from a server on the Internet. Alternatively, the computer program PG, the CMY profile PF1, the CMYK profile PF2, and the measured luminance data LD may be stored in a compact disc read-only memory (CD-ROM) from the CD-ROM. The CPU 210 executes the computer program PG to perform a printing process, described later. The CMY profile PF1, the CMYK profile PF2, and the measured luminance data LD will be described later.

In this embodiment, the print execution device 280 is an inkjet printing mechanism printing a color image using four types of inks serving as color materials: cyan (C), magenta (M), yellow (Y), and black (K). Alternatively, the print execution device 280 may be an electrophotographic printing mechanism printing a color image using toners serving as color materials. The user is provided with these color materials stored in respective containers (ink cartridges in this embodiment). The user can attach and detach these ink cartridges to and from the print execution device 280. When the user attaches an ink cartridge to the print execution device 280, ink is supplied to the print execution device 280. When no ink remains after printing, the user supplies ink to the print execution device 280 by replacing the ink cartridge to new one.

The terminal 100 is a computer used by the user of the printer 200. For example, the terminal 100 may be a personal computer or a smartphone. When a driver program provided by the manufacturer of the printer 200 is executed on the terminal 100, the terminal 100 functions as a printer driver for the printer 200. As the printer driver, the terminal 100 can transmit a printing instruction to the printer 200, enabling the printer 200 to perform printing, for example.

A-2: CMY Profile PF1 and CMYK Profile PF2

Figure 2:
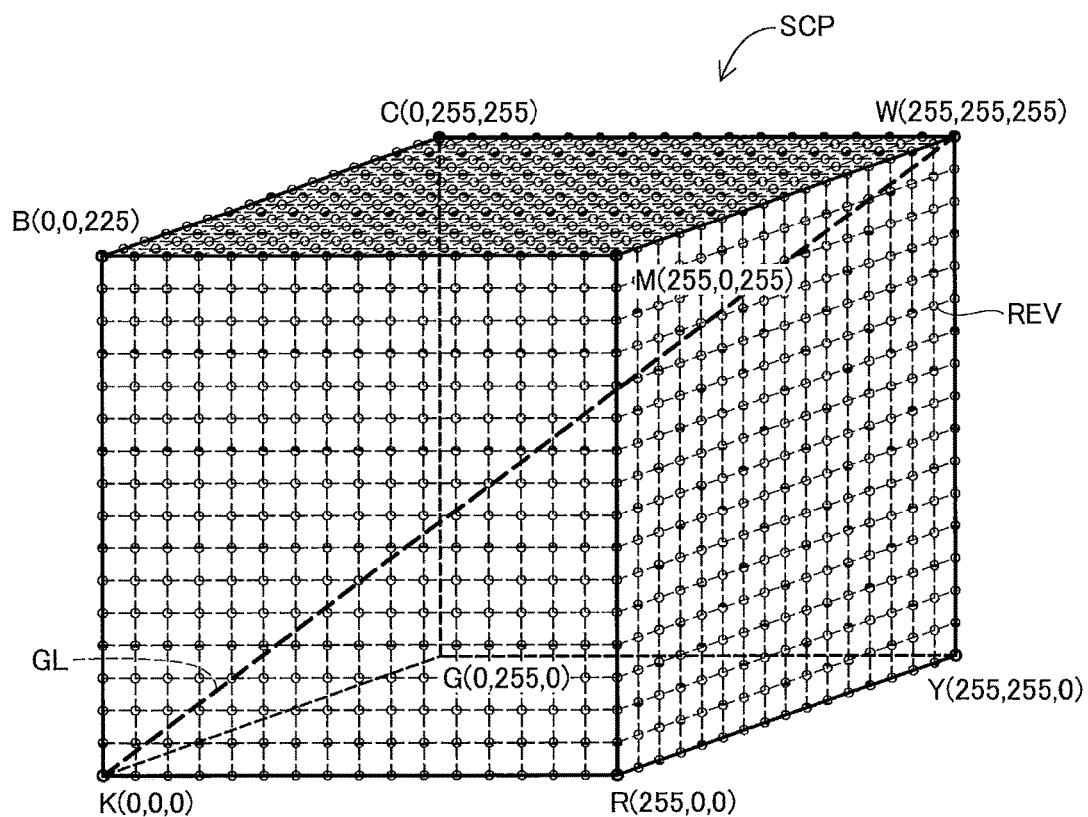
FIG. 2 is an explanation diagram illustrating an example of an RGB color space according to the first embodiment.

FIG. 2 illustrates an example of an RGB color space SCP. FIG. 3 illustrates part of the CMY profile PF1 and the CMYK profile PF2. The CMY profile PF1 includes a plurality of RGB values, as input values, and a plurality of CMY values, as output values. The CMY profile PF1 maps each of the RGB values to a corresponding one of the CMY values. Each RGB value indicates a color value in the RGB color space SC and includes three component values (an R value, a G value, and a B value) representing red (R), green (G), and blue (B), respectively. Each CMY value indicates a color value in a CMY color space and includes three component values (a C value, an M value, and a Y value) representing cyan (C), magenta (M), and yellow (Y), respectively. The three C, M, and Y component values correspond to a C ink, an M ink, and a Y ink, respectively, among the four types of inks used in the print execution device 280. In this manner, the CMY profile PF1 converts the plurality of input values (RGB values) into respective ones of the plurality of output values (CMY values). While each output value (CMY value) includes the three component values corresponding to the C ink, the M ink, and the Y ink, each output value (CMY value) does not include a component value corresponding to the K ink.

Specifically, the CMY profile PF1 is a lookup table mapping 4913 (17×17×17) RGB values in the RGB color space SCP to the respective CMY values. Specifically, the 4913 RGB values are set as follows. That is, seventeen specific component values are selected for each of the R, G, and B components so that the seventeen specific component values are arranged at substantially equal intervals in the range of 0 to 255. Here, the seventeen specific component values are composed of sixteen values represented by 16×n (n is an integer of 0≤n≤15) and the value of 255. As illustrated in FIG. 2, the RGB color space SCP is represented in a three-dimensional orthogonal coordinate system. In the RGB color space SCP, the 4913 scanner RGB values are lattice points arranged at regular intervals in a color gamut having a cube shape. Hereinafter, the 4913 RGB values will be referred to as "RGB representative values REV" or simply referred to as "representative values REV".

As shown in FIG. 2, a point K (black point), a point R (red point), a point G (green point), and a point B (blue point) indicate RGB values (0, 0, 0), (255, 0, 0), (0, 255, 0), and (0, 0, 255), respectively. Similarly, a point C (cyan point), a point M (magenta point), a point Y (yellow point), and a point W (white point) indicate RGB values (0, 255, 255), (255, 0, 255), (255, 255, 0), and (255, 255, 255), respectively. A broken line connecting the points W and K represents an achromatic axis GL in the RGB color space SCP.

Among the 4913 RGB representative values REV, seventeen achromatic representative values GEV (0, 0, 0), (16, 16, 16), (32, 32, 32), . . . , (240, 240, 240), and (255, 255, 255) are positioned along the achromatic axis GL. FIG. 3 illustrates, as part of the CMY profile PF1, these seventeen achromatic representative values GEV is mapped to the respective seventeen CMY values. In the CMY profile PF1, for example, the achromatic representative value GEV (0, 0, 0) is mapped to a CMY value (136, 190, 151). The achromatic representative value GEV (16, 16, 16) is mapped to a CMY value (116, 145, 107). The K ink is not used during printing using the CMY profile PF1. Therefore, when printing black, the three CMY inks are used to express black.

The CMYK profile PF2 includes the plurality of RGB values, as input values, and a plurality of CMYK values, as output values. The CMYK profile PF2 maps each of the RGB values to a corresponding one of the CMYK values. Each CMYK value indicates a color value in a CMYK color space and includes four component values (a C value, an M value, a Y value, and a K value) representing cyan (C), magenta (M), yellow (Y), and black (K), respectively. The four C, M, Y, and K component values correspond to the C ink, the M ink, the Y ink, and the K ink, respectively, used in the print execution device 280. In this manner, the CMYK profile PF2 converts the plurality of input values (RGB values) into the respective output values (CMYK values). Each CMYK value includes the component values corresponding to the C ink, the M ink, the Y ink, and the K ink. In this embodiment, each of an R value, a G value, a B value, a C value, an M value, a Y value, and a K value is represented by 8 bits (256 gradations).

Similarly to the CMY profile PF1, the CMYK profile PF2 is a lookup table mapping the 4913 RGB representative values REV in the RGB color space SCP (FIG. 2) to the respective CMYK values. FIG. 3 illustrates part of the CMYK profile PF2. As illustrated in FIG. 3, the seventeen achromatic representative values GEV (0, 0, 0), (16, 16, 16), (32, 32, 32), . . . , (240, 240, 240), and (255, 255, 255) positioned along the achromatic axis GL are mapped to the respective seventeen CMYK values. In the CMYK profile PF2, for example, the achromatic representative value GEV (0, 0, 0) is mapped to a CMYK value (0, 0, 0, 255). The achromatic representative value GEV (16, 16, 16) is mapped to a CMYK value (22, 22, 29, 229). When printing black using the CMYK profile PF2, the K ink is used to express black.

A-3: Measured Luminance Data LD

Figure 4:
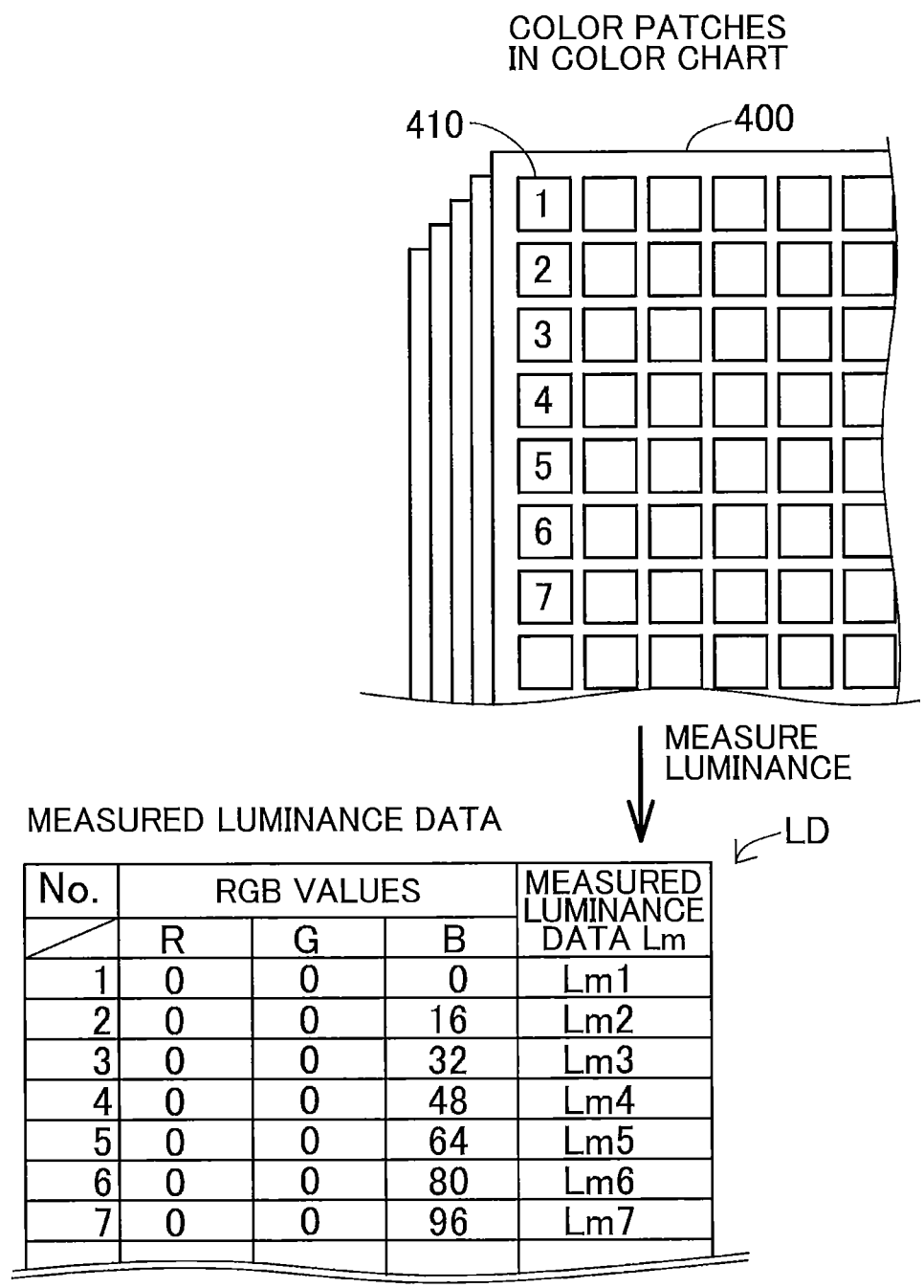
FIG. 4 is an explanation diagram illustrating an example of measured luminance data according to the first embodiment.

FIG. 4 illustrates an example of the measured luminance data LD. The measured luminance data LD includes 4913 measured luminances Lm for the respective 4913 RGB representative values REV. A color chart 400 includes 4913 color patches 410 arranged in a grid pattern. The 4913 color patches 410 are printed by the print execution device 280. Each of the color patches 410 is based on a CMY value mapped from one RGB representative value REV in the CMY profile PF1 for example. Alternatively, each of the color patches 410 may be based on a CMYK value mapped from a corresponding one RGB representative value REV in the CMYK profile PF2. Each of 4913 color patches 410 is measured by a spectrophotometer (e.g., i1iSis manufactured by X-rite) to obtain the measured luminance Lm. When the CMY value mapped from an RGB value in the profile PF1 and the CMYK value in the profile PF2 is mapped from the same RGB value, the CMY value and the CMYK value represent approximately the same color. Thus, the measured luminance data LD created using the CMY profile PF1 is approximately the same as the measured luminance data LD created using the CMYK profile PF2. The measured luminance data LD is created in advance by the manufacturer of the printer 200, for example.

A-4: Printing Process

Figure 5:
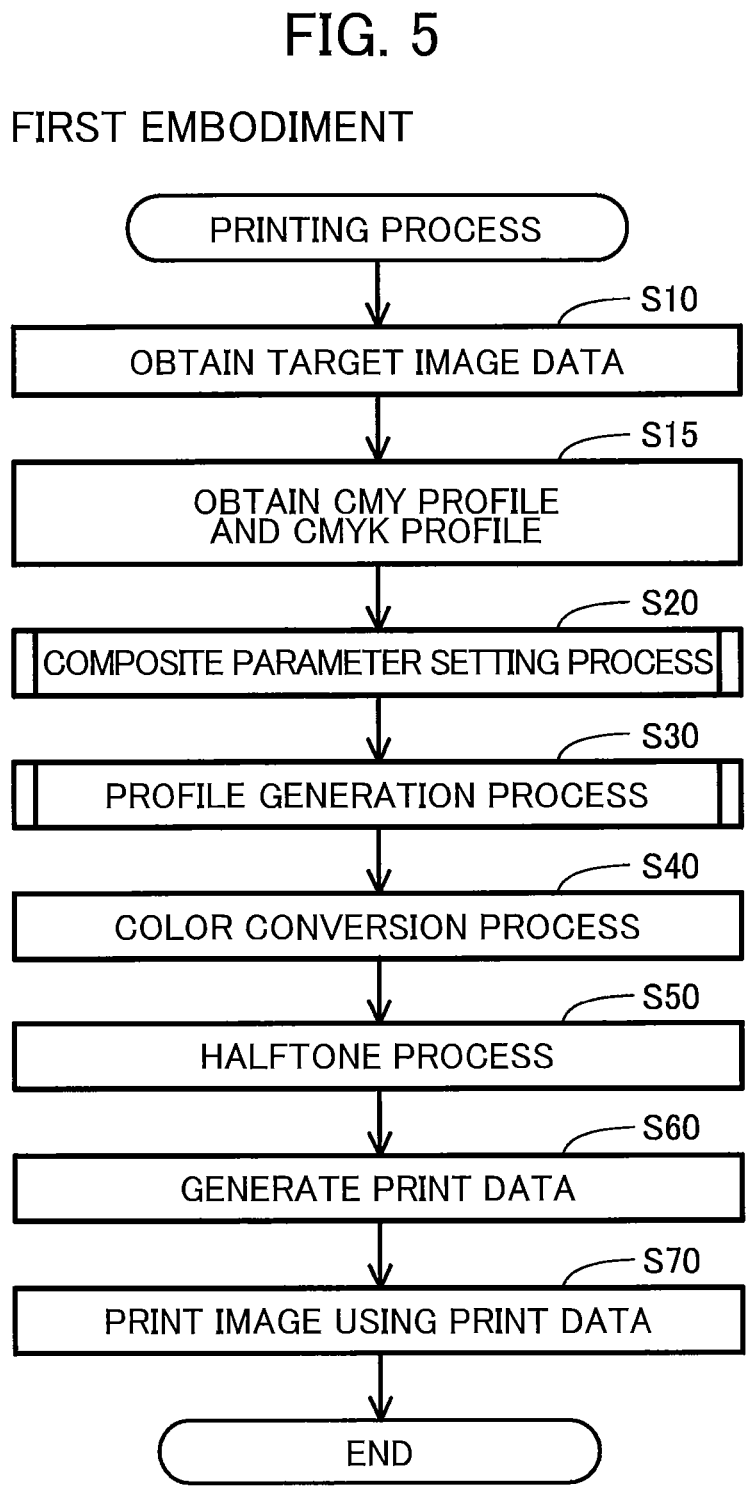
FIG. 5 is a flowchart illustrating a printing process according to the first embodiment.

FIG. 5 is a flowchart illustrating a printing process. The CPU 210 performs the printing process so that the print execution device 280 prints a target image using target image data. The CPU 210 starts the printing process, for example, when the printer 200 receives printing instructions from the user via the operation interface 250 or the terminal 100.

In S10, the CPU 210 obtains target image data. The target image data represents a target image to be printed. The target image data is selected by the user from a plurality of sets of image data stored in the non-volatile storage 230, for example. Alternatively, the target image data may be transmitted from the terminal 100 with printing instructions. Further, the target image data may be generated by an application program that creates documents or images. Alternatively, the target image data may be generated from an original optically read by a scanner (not illustrated) or a digital camera (not illustrated) using an image sensor.

In this embodiment, the obtained target image data includes a plurality of pixel values. Each of the pixel values represents the color of the pixel using an RGB value. In other words, the target image data is RGB image data. For example, the RGB value of one pixel includes three component values (hereinafter also referred to as an R value, a G value, a B value) representing red (R), green (G), and blue (B), respectively. When the obtained target image data is not RGB image data, the target image data is converted into RGB image data by a conversion process such as rasterization.

In S15, the CPU 210 obtains the CMY profile PF1 and the CMYK profile PF2 from the non-volatile storage 230. The obtained CMY profile PF1 and CMYK profile PF2 are temporarily stored in the volatile storage 220.

In S20, the CPU 210 performs a composite parameter setting process. In the composite parameter setting process, the CPU 210 specifies a composite start luminance Ls and a composite end luminance Le. The CPU 210 uses the composite start luminance Ls and the composite end luminance Le as parameters to generate a profile PF3 in a profile generation process in S30. The profile PF3 is used in a color conversion process in S40. The composite parameter setting process will be described later.

In S30, the CPU 210 performs the profile generation process. In the profile generation process, the CPU 210 generates the profile PF3 by using the CMY profile PF1 and the CMYK profile PF2 in addition to the composite start luminance Ls and the composite end luminance Le set in S20. In this embodiment, the profile PF3 is a lookup table mapping the 4913 RGB values in the RGB color space SCP (FIG. 2) to the respective CMYK values, similarly to the CMYK profile PF2.

In S40, the CPU 210 performs the color conversion process on the target image data (RGB image data). In the color conversion process, the CPU 210 converts the RGB values of the pixels in the target image data into the respective CMYK values using the profile PF3. The CMYK image data having the CMYK values is generated through the color conversion process.

In S50, the CPU 210 performs a halftone process on the generated CMYK image data using a conventional method, such as an error diffusion method or a dithering method. Through the halftone process, the CPU 210 generates sets of dot data. The dot data specifies a dot formation state, that is, how a dot is to be formed, for each pixel and for each ink. A pixel value in each dot data at least specifies whether the pixel forms a dot. In addition, the pixel value may also specify the dot type (e.g., the size of the dot). Specifically, each pixel value may specify one of two pixel formation states, that is, a state where a dot is to be formed or a state where no dot is to be formed. Alternatively, each pixel value may specify "large dot", "middle dot", "small dot", or "no dot" indicating how the dot is to be formed.

In S60, the CPU 210 generates print data using the sets of dot data. When generating the print data, the CPU 210 performs two process, for example. In one process, the CPU 210 sorts the sets of dot data in the order in which the print execution device 280 uses the sets of dot data during printing. In the other process, the CPU 210 adds printer control code and data identification code to the dot data. In S70, the CPU 210 controls the print execution device 280 so that the print execution device 280 prints an image using the generated print data.

A-5: Composite Parameter Setting Process

The composite parameter setting process in S20 (FIG. 5) will be described while referring to a flowchart shown in FIG. 6. In S100, the CPU 210 obtains the amounts of inks remaining in the respective ink cartridges attached to the print execution device 280. A conventional ink volume sensor may be installed in each ink cartridge, for example, and the CPU 210 may obtain the amount of ink remaining in each ink cartridge detected by the corresponding conventional ink volume sensor. Alternatively, the CPU 210 may calculate the cumulative amount of each ink consumed since the corresponding ink cartridge is replaced, and store the cumulative amount of ink consumed in the non-volatile storage 230. To obtain the amount of ink consumed during printing, the CPU 210 converts the number of dots formed during printing into the consumed amount of ink. In this manner, the CPU 210 can calculate the amount of ink currently remaining in the ink cartridge based on the amount of ink initially stored in the ink cartridge and the cumulative amount of ink consumed since the ink cartridge is replaced. The CPU 210 obtains the remaining amount of ink for each of cyan, magenta, yellow, and black.

In S105, the CPU 210 determines whether the smallest remaining amount of chromatic ink RIs is smaller than the remaining amount of K ink RIk. The smallest remaining amount of chromatic ink is smallest one of the remaining amounts of inks for three chromatic inks, i.e., CMY inks.

When the remaining amount of ink falls below a reference value, the user needs to replenish the ink (by replacing the ink cartridge in this embodiment). If the times when the respective types of inks fall below the reference value are significantly different from each other, the times for replenishing inks are dispersed. As a result, the user is forced to replenish the inks frequently. In this case, a long time period, during which the ink replenishment is unnecessary, would be rarely occur, thereby increasing a burden on the user. If the different types of inks fall below the reference value at approximately the same time, the need for ink replenishment arises at approximately the same time among the different inks. This allows the user to replenish the different types of inks at once or at approximately the same time in a relatively short period of time. As a result, once the user has replenished all the inks in a relatively short period of time, the need for ink replenishment does not arise for a relatively long period of time, thereby reducing a burden on the user. Desirably, therefore, the remaining amounts of chromatic ink and the remaining amount of K ink are not different from each other excessively. Thus, when the smallest amount of remaining chromatic inks is smaller than the remaining amount of K ink, the CPU 210 uses preferentially the K ink to print black, so as to reduce the consumption of the chromatic inks. When the smallest amount of remaining chromatic ink is larger than the remaining amount of K ink, the CPU 210 uses preferentially the chromatic inks to print black, so as to reduce the consumption of K ink.

Referring back to FIG. 6, when in S105 the smallest amount of remaining chromatic ink RIs is smaller than the remaining amount of K ink RIk (RIs<RIk) (S105: Yes), in S110 the CPU 210 specifies the CMY profile PF1 as a bright-range profile. The bright-range profile is used for color conversion in a relatively bright color gamut including white. In S115, the CPU 210 specifies the CMYK profile PF2 as a dark-range profile. The dark-range profile is used for color conversion in a relatively dark color gamut including black.

When in S105 the smallest amount of remaining chromatic ink RIs is equal to or larger than the remaining amount of K ink RIk (S105: No), in S120 the CPU 210 specifies the CMYK profile PF2 as the bright-range profile. In S125, the CPU 210 specifies the CMY profile PF1 as the dark-range profile.

In S130, the CPU 210 subtracts the remaining amount of K ink RIk from the smallest amount of remaining chromatic ink RIs to calculate a difference $\Delta RI$ ($\Delta RI = RIs - RIk$).

In S135, the CPU 210 determines the composite start luminance Ls using the difference $\Delta RI$ calculated in S130. In this embodiment, the luminance L is represented by 256 gradations from 0 to 255, for example. In the profile PF3, as described later, the dark-range profile, a composite profile, and the bright-range profile are used for a dark range, a composite range, and a bright range, respectively. Specifically, the dark-range profile is used for the dark range of a luminance L satisfying $0 \leq L < Ls$. The composite profile is used for the composite range of the luminance L satisfying Ls≤L≤Le (Le represents the composite end luminance described later.). The composite profile is a composite of the dark-range profile and the bright-range profile. The bright-range profile is used for the bright range of the luminance L satisfying Le<L≤255. The composite start luminance Ls is calculated using a predetermined formula.

Figure 7A:
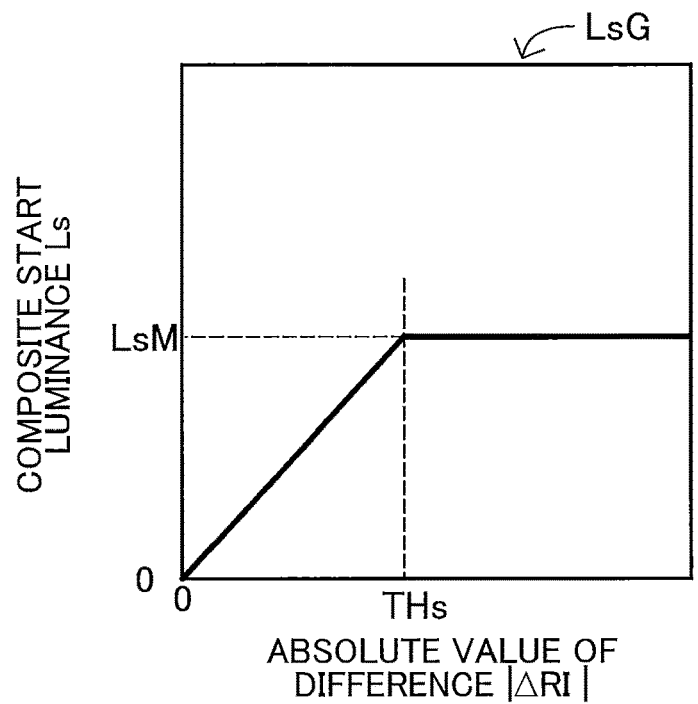
FIG. 7A is a graph illustrating a relation between a composite start luminance and an absolute value of a difference concerning remaining amounts of inks.
Figure 7B:
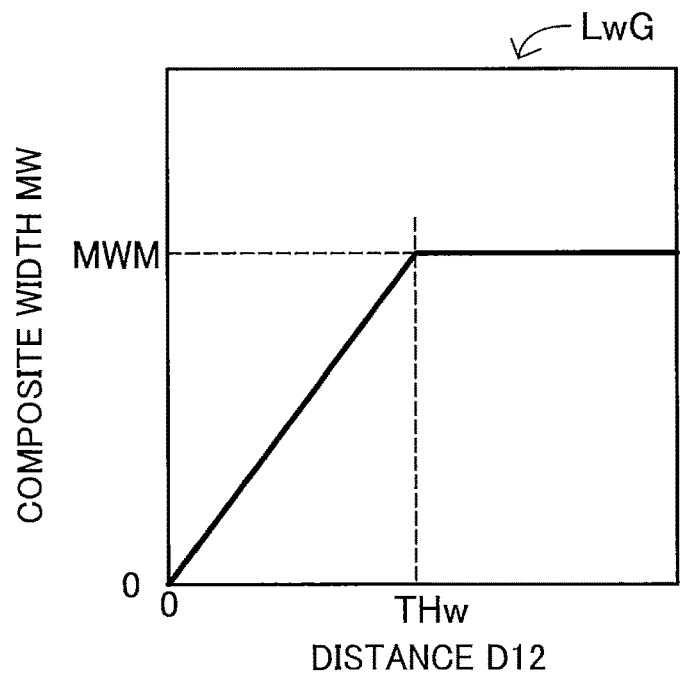
FIG. 7B is a graph illustrating a relation between a composite width and a distance in a CMYK color space.

FIGS. 7A and 7B illustrate how the composite start luminance Ls and the composite end luminance Le are calculated. A graph LsG in FIG. 7A represents a correspondence between the absolute value |ΔRI| of the difference ΔRI and the composite start luminance Ls to be specified. As illustrated in the graph LsG, when the difference ΔRI is 0, the composite start luminance Ls is 0. In the range of 0≤|ΔRI|≤THs (THs indicates a predetermined threshold), as the absolute value |ΔRI| increases, the composite start luminance Ls increases linearly and monotonically from 0 to a predetermined upper limit LsM. In the range of THs<|ΔRI|, the composite start luminance Ls is fixed to the upper limit LsM. Thus, the composite start luminance Ls is determined by the following formula (1). In the formula (1), a coefficient K1 is represented by (LsM/THs).

$$Ls=K1\times|\Delta RI| \quad (0\le|\Delta RI|\le THs), \text{ and}$$

$$Ls=LsM(THs<|\Delta RI|) \tag{1}$$

Referring back to FIG. 6, in S140, the CPU 210 identifies a CMY value in the CMY profile PF1 having a luminance closest to the composite start luminance Ls among the CMY values mapped from the seventeen achromatic representative values GEV (represented in the RGB color space) positioned along the achromatic axis GL (see FIG. 2) (hereinafter also referred to as "CMY values on the achromatic axis GL"). A CMY value having a luminance closest to the composite start luminance Ls will also be referred to as "the closest CMY value". Specifically, among the measured luminances Lm correlated to the seventeen achromatic representative values GEV by the measured luminance data LD (FIG. 4), the CPU 210 identifies one measured luminance Lm having the smallest difference from the composite start luminance Ls, and identifies an achromatic representative value GEV correlated to the identified measured luminance Lm. The CPU 210 identifies, as the closest CMY value, a CMY value which is mapped from the identified achromatic representative value GEV in the CMY profile PF1. In a set of entries Es in FIG. 3, the achromatic representative value GEV (144, 144, 144) is mapped to a CMY value (32, 31, 26). In the following description, the closest CMY value is assumed to be the CMY value (32, 31, 26).

In S145, the CPU 210 identifies a CMYK value in the CMYK profile PF2 having a luminance closest to the composite start luminance Ls among the CMYK values mapped from the seventeen achromatic representative values GEV located along the achromatic axis GL (hereinafter also referred to as "CMYK values on the achromatic axis GL"). A CMYK value having a luminance closest to the composite start luminance Ls will also be referred to as "the closest CMYK value". Specifically, the CPU 210 identifies the achromatic representative value GEV having a luminance with the smallest difference from the composite start luminance Ls. Further, the CPU 210 identifies, as the closest CMYK value, a CMYK value mapped from the identified achromatic representative value GEV in the CMYK profile PF2. In the set of entries Es in FIG. 3, the achromatic representative value GEV (144, 144, 144) is mapped to a CMYK value (22, 19, 20, 15). In the following description, the closest CMYK value is assumed to be the CMYK value (22, 19, 20, 15).

In S150, the CPU 210 calculates a distance D12 between the closest CMY value and the closest CMYK value. The distance D12 is represented by the following formula (2). In the formula (2), the closest CMY value is (C1, M1, Y1) and the closest CMYK value is (C2, M2, Y2, K2). Because the CMY value does not have a component value K, K1 is fixedly set to zero. SQRT(a) represents the square root of a. In other words, the distance D12 serves as an index value indicating a difference between the closest CMY value and the closest CMYK.

$$D12=SQRT\{(C1-C2)^2+(M1-M2)^2+(Y1-Y2)^2+(K1-K2)^2\} \tag{2}$$

In S160, the CPU 210 determines the composite end luminance Le using the distance D12 calculated in S150. In the profile PF3, as described later, the composite profile is used for the composite range, and the bright-range profile is used for the bright range. Specifically, the composite profile is used for the composite range having a luminance L of Ls≤L≤Le. The composite profile is a composite of the dark-range profile and the bright-range profile. The bright-range profile is used for the bright range having a luminance L of Le<L≤255. The composite end luminance Le is calculated using a predetermined formula.

FIG. 7B illustrates a graph LwG representing a correspondence between the distance D12 and a composite width MW. The composite width MW refers to a difference between the determined composite start luminance Ls and the composite end luminance Le (MW=Le−Ls). As illustrated in the graph LwG, when the distance D12 is 0, the composite width MW is 0. In the range of 0≤D12≤THw (THw indicates a predetermined threshold), as the distance D12 increases, the composite width MW increases linearly and monotonically from 0 to a predetermined upper limit MWM. In the range of THw<D12≤255, the composite width MW is fixed to the upper limit LeM. That is, the composite width MW is determined by the following formula (3). In the formula (3), K2 is a coefficient represented by (MWM/THw).

$$MW=K2\times D12 \quad (0\le D12\le THw), \text{ and}$$

$$MW=MWM(THw<D12) \tag{3}$$

As described above, MW=(Le−Ls). The CPU 210 adds the composite width MW to the composite start luminance Ls to obtain the composite end luminance Le (Le=(Ls+MW)).

When the CPU 210 has determined the composite start luminance Ls and the composite end luminance Le, the CPU 210 ends the composite parameter setting process. By determining the composite start luminance Ls and the composite end luminance Le, the range of the luminance L is divided into the above-described three ranges: the dark range (0≤L<Ls), the composite range (Ls≤L≤Le), and the bright range (Le<L≤255).

A-6: Profile Generation Process

Figure 8:
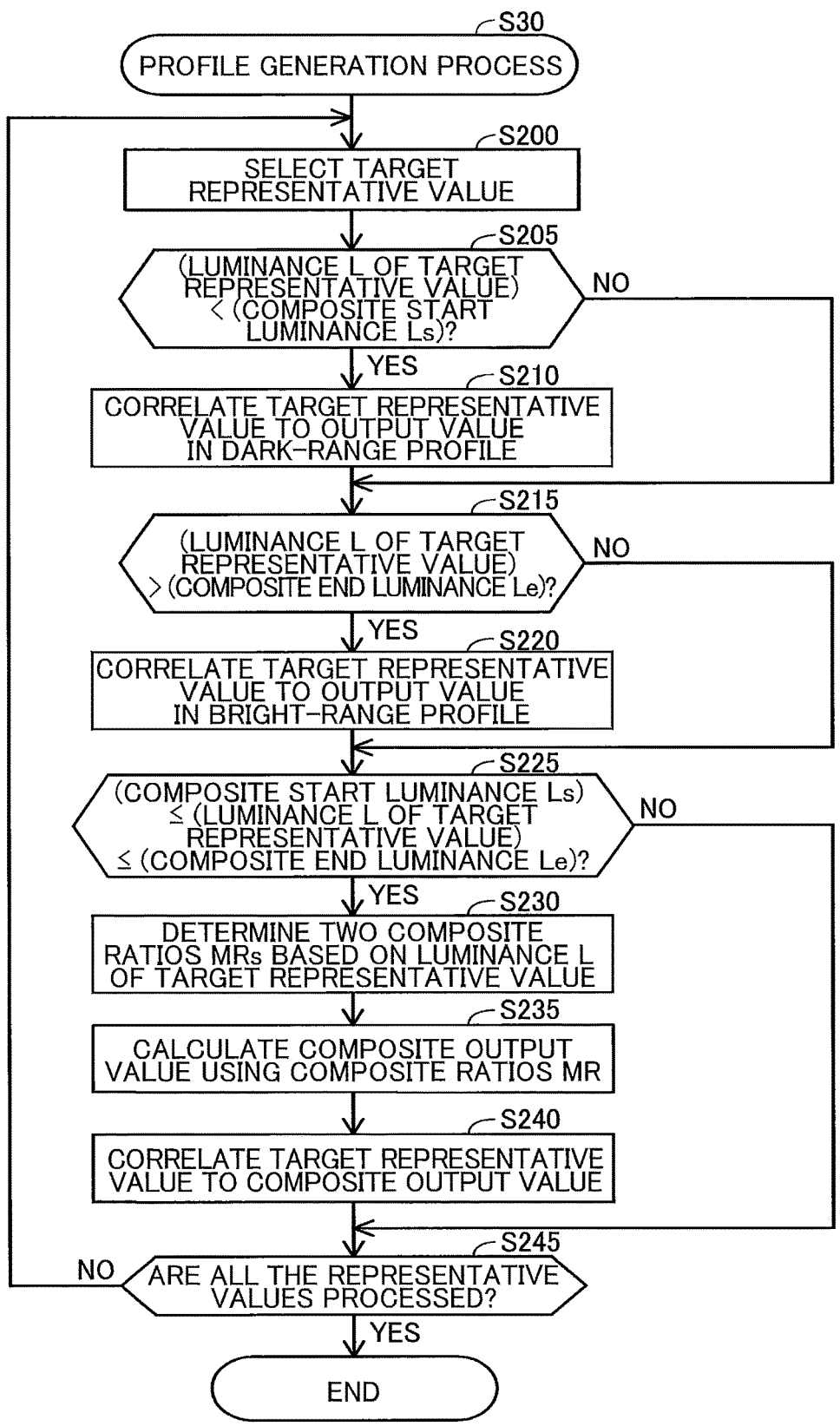
FIG. 8 is a flowchart illustrating the profile generation process according to the first embodiment.

Referring to FIG. 8, the profile generation process in S30 (FIG. 5) will be described. FIG. 8 is a flowchart illustrating the profile generation process. In S200, the CPU 210 selects a representative value as a target representative value from the 4913 representative values REV.

In S205, the CPU 210 determines whether the luminance L of the target representative value is lower than the composite start luminance Ls. Specifically, the CPU 210 identifies, as a luminance of the target representative value, the measured luminance Lm which is correlated to the target representative value in the measured luminance data LD (FIG. 4). The CPU 210 then determines whether the luminance L of the target representative value is lower than the composite start luminance Ls.

When the luminance L of the target representative value is lower than the composite start luminance Ls (S205: YES), the luminance L of the target representative value falls within the dark range ($0 \leq L < Ls$). In S210, the CPU 210 correlates the target representative value to an output value in the dark-range profile. That is, when the dark-range profile is the CMY profile PF1, the target representative value is correlated to the CMY value, which is mapped from the target representative value in the CMY profile PF1, as the output value. When the dark-range profile is the CMYK profile PF2, the target representative value is correlated to the CMYK value, which is mapped from the target representative value in the CMYK profile PF2, as the output value. This correlation is used for the profile PF3.

When the luminance L of the target representative value is equal to or higher than the composite start luminance Ls (S205: NO), the luminance L of the target representative value is out of the dark range. In this case, the CPU 210 skips S210.

In S215, the CPU 210 determines whether the luminance L of the target representative value is higher than the composite end luminance Le. That is, the CPU 210 determines whether the measured luminance Lm (FIG. 4), which is correlated to the target representative value in the measured luminance data LD, is higher than the composite end luminance Le.

When the luminance L of the target representative value is higher than the composite end luminance Le (S215: YES), the luminance L of the target representative value falls within the bright range (Le<L). In S220, the CPU 210 correlates the target representative value to an output value in the bright-range profile. That is, when the bright-range profile is the CMY profile PF1, the target representative value is correlated to the CMY value, which is mapped from the target representative value in the CMY profile PF1, as the output value. When the bright-range profile is the CMYK profile PF2, the target representative value is correlated to the CMYK value, which is mapped from the target representative value in the CMYK profile PF2, as the output value. This correlation is used for the profile PF3.

When the luminance L of the target representative value is equal to or lower than the composite end luminance Le (S215: NO), the luminance L of the target representative value is out of the bright range. In this case, the CPU 210 skips S220.

In S225, the CPU 210 determines whether the luminance L of the target representative value is equal to or higher than the composite start luminance Ls and equal to or lower than the composite end luminance Le. That is, the CPU 210 determines whether the measured luminance Lm, which is correlated to the target representative value in the measured luminance data LD (FIG. 4), is equal to or higher than the composite start luminance Ls and equal to or lower than the composite end luminance Le.

When the luminance L of the target representative value is equal to or higher than the composite start luminance Ls and equal to or lower than the composite end luminance Le (S225: YES), the luminance L of the target representative value falls within the composite range ($Ls \leq L \leq Le$). In S230 to S240, the CPU 210 correlates the target representative value to a composite output value. The composite output value is generated using an output value in the bright-range profile and an output value in the dark-range profile.

Figure 9:
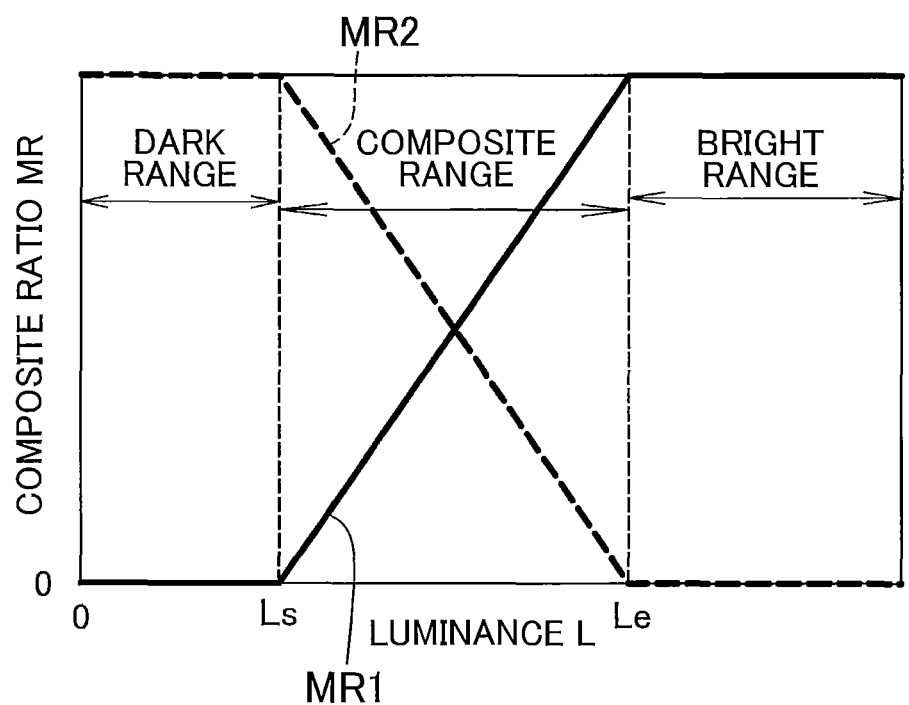
FIG. 9 is a graph illustrating a relation between a composite ratio and a luminance.

In S230, the CPU 210 determines two composite ratios MR (MR1 and MR2) based on the luminance L of the target representative value. FIG. 9 illustrates a method for determining each composite ratio MR. A graph in FIG. 9 shows a correspondence between the luminance L of the target representative value and the composite ratios MRs. A composite ratio MR1 is depicted by the solid line. A composite ratio MR2 is indicated by the broken line. The composite ratio MR1 indicates the proportion of the bright-range profile in the composition. The composite ratio MR2 indicates the proportion of the dark-range profile in the composition. These ratios satisfy MR1=(1−MR2). In the composite range ($Ls \leq L \leq Le$), as the luminance L of the target representative value increases, the composite ratio MR1 of the bright-range profile increases linearly and monotonically from 0 to 1. In the composite range ($Ls \leq L \leq Le$), as the luminance L of the target representative value increases, the composite ratio MR2 of the dark-range profile decreases linearly and monotonically from 1 to 0. Thus, the composite ratios MR1 and MR2 are determined by the following formula (4).

$$MR1=(L-Ls)/(Le-Ls)(Ls \leq L \leq Le), \text{ and}$$

$$MR2=(Le-L)/(Le-Ls)(Ls \leq L \leq Le) \qquad (4)$$

Referring back to FIG. 8, in S235, the CPU 210 calculates a composite output value using the determined composite ratios MR1 and MR2 so as to correlate the target representative value to the calculated composite output value. The following formula (5) represents a composite output value (Co, Mo, Yo, Ko) to be correlated with the target representative value. Here, Ca, Ma, Ya, and Ka represent component values of the output value mapped from the target representative value in the bright-range profile. Cb, Mb, Yb, and Kb represent component values of the output value mapped from the target representative value in the dark-range profile.

$$Co=MR1 \times Ca+MR2 \times Cb,$$

$$Mo=MR1 \times Ma+MR2 \times Mb,$$

$$Yo=MR1 \times Ya+MR2 \times Yb, \text{ and}$$

$$Ko=MR1 \times Ka+MR2 \times Kb \qquad (5)$$

Since one of the dark-range profile and the bright-range profile is the CMY profile PF1, one of the two K component values Ka and Kb does not exist. In the formula (5), either Ka or Kb that does not exist is set as "0". As indicated by the formula (5), the composite output value (Co, Mo, Yo, Ko) is the CMYK value including four C, M, Y, and K component values.

In S240, the CPU 210 correlates the target representative value to the calculated composite output value (Co, Mo, Yo, Ko). This correlation is used for the profile PF3.

In S245, the CPU 210 determines whether all the 4913 representative values REV have been processed as the target representative value. When there is any unprocessed representative value REV (S245: NO), the CPU 210 returns to S200. When all the representative values REV have been processed (S245: YES), the CPU 210 ends the profile generation process. At this point, the profile PF3 has been generated. As indicated by the process in FIG. 8, the luminance L falls into one of the three ranges: the dark range, the bright range, and the composite range. This, in turn, divides the RGB color space SCP into three ranges: similarly, the dark range, the bright range, and the composite range. The range of the luminance L is divided by the composite start luminance Ls and the composite end luminance Le. The composite start luminance Ls is the luminance of an RGB value at the boundary between the dark range and the composite range. The composite end luminance Le is the luminance of an RGB value at the boundary between the composite range and the bright range. The RGB value having luminance Ls is identified by interpolation using the representative values REV having luminances in the vicinity of the luminances Ls in the measured luminance data LD. The RGB value having luminance Le is identified similarly to the luminance Ls.

According to the embodiment, the CPU 210 generates the profile PF3 (FIG. 8 and S30 in FIG. 5) using the dark-range profile (e.g., the CMY profile PF1) and the bright-range profile (e.g., the CMYK profile PF2). By using the profile PF3, the CPU 210 converts the input values (the plurality of RGB values) into the output values (CMYK values in this embodiment). The output values are, therefore, based on at least one of the output values in the dark-range profile (e.g., CMY values) and the output values in the bright-range profile (e.g., CMYK values). In the profile PF3, each of the RGB values in the dark range is mapped to the output value which is mapped from the RGB value in the dark-range profile (S205 and S210 in FIG. 8). In the profile PF3, each of the RGB values in the bright range located apart from the dark range is mapped to the output value which is mapped from the RGB value in the bright-range profile (S215 and S220 in FIG. 8). In the profile PF3, each of the RGB values in the composite range between the dark range and the bright range is mapped to the output value calculated using both the output value which is mapped from the RGB value in the dark-range profile and the output value which is mapped from the RGB value in the bright-range profile (S225 to S240 in FIG. 8). As described in S135 in FIG. 6, the CPU 210 determines the composite start luminance Ls indicating the luminance of an RGB value at the boundary between the dark range and the composite range. In S140 to S160 in FIG. 6, the CPU 210 determines the composite end luminance Le using both of the output values (CMY value and CMYK value) of the RGB value (e.g., the RGB value (144, 144, 144) in the entry Es in FIG. 3) having a luminance closest to the composite start luminance Ls. Since the CPU 210 generates the profile PF3 using the composite start luminance Ls and the composite end luminance Le (FIG. 8), the CPU 210 can properly determine the boundaries of the composite range in the profile PF3. When printing with different types of inks, therefore, the profile PF3 allows the CPU 210 to print an image with sufficient quality based on the plurality of profiles (the CMY profile PF1 and the CMYK profile PF2).

In terms of the image quality, using only one of the CMY profile PF1 and the CMYK profile PF2 is desirable. This is because the CMY profile PF1 is optimized to achieve desirable image quality when printing with the three CMY inks, while the CMYK profile PF2 is optimized to achieve desirable image quality when printing with the four CMYK inks. However, when, as in this embodiment, both the CMY profile PF1 and the CMYK profile PF2 are used for adjusting the remaining amounts of inks, for example, the image quality may deteriorate. For example, an image printed using the composite range, in which the CMY profile PF1 and the CMYK PF2 are synthesized, is lower in quality than an image printed using the bright range and the dark range in which corresponding one of the CMY profile PF1 and the CMYK profile PF2 is adopted. Therefore, an excessively widen composite range is more likely to deteriorate the image quality. However, the absence of the composite range may result in a significant difference in color at the boundary between the bright range (e.g., the range using the CMY profile PF1) and the dark range (e.g., the range using the CMYK profile PF2). In a conceivable case where no composite range is provided, if an image includes the colors adjacent to the boundary, an unnatural and significant difference could arise between the colors, deteriorating image quality. Therefore, when there is a relatively large difference between the CMY value (CMY profile PF1) and the CMYK value (CMYK profile PF2) adjacent to the boundary, it is preferable to provide a relatively wide composite range between the dark range and the bright range for reducing a significant difference in color.

In this embodiment, therefore, the CPU 210 determines the composite end luminance Le based on the distance D12 between the CMY value in the CMY profile PF1 and the CMYK value in the CMYK profile PF2 which are mapped from an RGB value having a luminance closest to the composite start luminance Ls. By using the profile PF3, the CPU 210 can print an image with sufficient quality.

In this embodiment, in S10 (FIG. 5), the CPU 210 obtains target image data representing a target image and having RGB values. In S40 to S60, the CPU 210 performs the print data generation process including the color conversion process. Specifically, in S40, the CPU 210 converts the RGB values into the CMYK values using the profile PF3. In S60 the CPU 210 generates print data. In S70, the CPU 210 controls the print execution device 280 to print the image using the print data. Accordingly, the print execution device 280 can print the image with sufficient quality.

As illustrated in FIG. 7B and the formula (3), in the range of 0 to the threshold THw, the composite end luminance Le is set so that the greater the distance D12 is, the larger the difference (the composite width MW) between the composite start luminance Ls and the composite end luminance Le is. With this configuration, even when the output value, which is mapped from the RGB value having a luminance closest to the composite start luminance Ls in the CMY profile PF1, is significantly different in color from the output value mapped from the same RGB value in the CMYK profile PF2, deterioration in quality of the printed image can be reduced.

In this embodiment, a consumption amount of K ink during printing varies depending on whether printing is performed using the CMY profile PF1 or the CMYK profile PF2. When printing is performed using the CMY profile PF1, the consumption amount of K ink is zero. When printing is performed using the CMYK profile PF2, the consumption amount of K ink is larger than zero. As described in S130 and S135 in FIG. 6, the CPU 210 determines the composite start luminance Ls based on the remaining amount of K ink. Accordingly, the CPU 210 can determine the composite start luminance Ls appropriately on the basis of the remaining amount of K ink.

Consumption amounts of chromatic inks (C, M, Y inks) during printing varies depending on whether printing is performed using the CMY profile PF1 or the CMYK profile PF2. Printing using the CMY profile PF1 does not consume the K ink. In other words, printing using the CMY profile PF1 consumes more chromatic inks than printing using the CMYK profile PF2. As described in S130 and S135 in FIG. 6, the CPU 210 determines the composite start luminance Ls based on the remaining amount of chromatic inks. Accordingly, the CPU 210 can determine the composite start luminance Ls appropriately on the basis of the remaining amount of chromatic inks.

Figure 6:
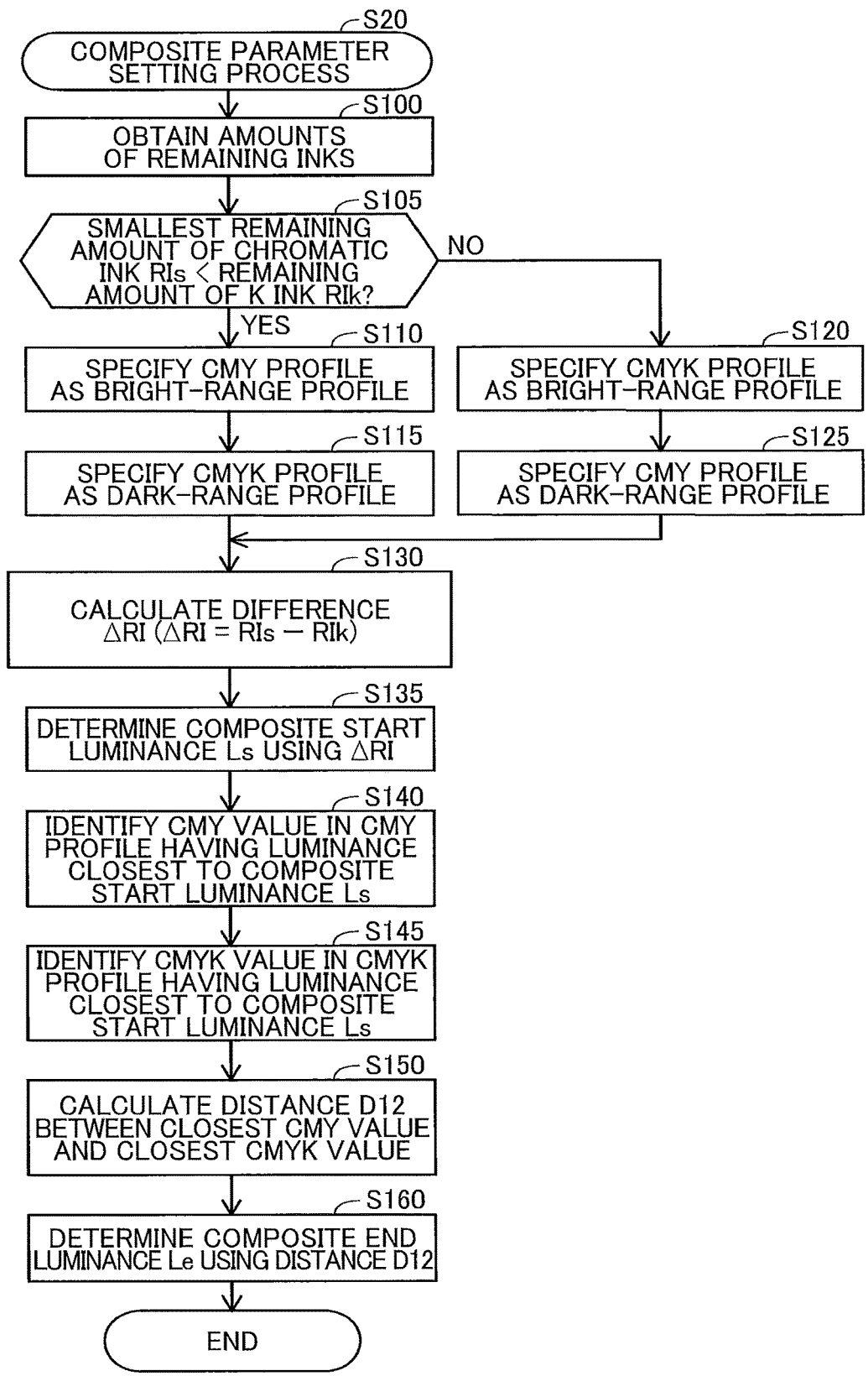
FIG. 6 is a flowchart illustrating a composite parameter setting process according to the first embodiment.

For example, the dark-range profile is the CMY profile PF1 and the bright-range profile is the CMYK profile PF2 (S105 in FIG. 6: NO). In this case, as the remaining amount of K ink RIk becomes smaller compared to the smallest amount of remaining chromatic ink RIs, the absolute value of the difference ΔRI becomes greater. As illustrated in FIG. 7A, in the range of 0 to the threshold THs, as the absolute value of the difference ΔRI becomes greater, the composite start luminance Ls becomes higher. In this manner, as the remaining amount of K ink RIk becomes smaller compared to the smallest amount of remaining chromatic ink RIs, the composite start luminance Ls is determined to be higher. This reduces the consumption amount of the K ink.

When YES determination is made in S105 in FIG. 6, the dark-range profile is the CMYK profile PF2 and the bright-range profile is the CMY profile PF1. In this case, as the smallest amount of remaining chromatic ink RIs becomes smaller compared to the remaining amount of K ink RIk, the absolute value of the difference ΔRI becomes greater. As illustrated in FIG. 7A, in the range of 0 to the threshold THs, as the absolute value of the difference ΔRI becomes greater, the composite start luminance Ls becomes higher. In this manner, as the smallest amount of remaining chromatic ink RIs becomes smaller compared to the remaining amount of K ink RIk, the composite start luminance Ls is determined to be higher. This reduces the consumption amount of chromatic inks.

In this embodiment, when in S105 (FIG. 6) the remaining amount of K ink RIk is smaller than the smallest amount of remaining chromatic ink RIs (S105: NO), in S120 the CPU 210 determines the CMYK profile PF2 as the bright-range profile, and in S125 the CPU 210 determines the CMY profile PF1 as the dark-range profile. When in S105 the smallest amount of remaining chromatic ink RIs is smaller than the remaining amount of K ink RIk (S105: YES), in S110 the CPU 210 determines the CMY profile PF1 as the bright-range profile, and in S115 the CPU 210 determines the CMYK profile PF2 as the dark-range profile. In this manner, when the remaining amount of K ink RIk is smaller than the smallest amount of remaining chromatic ink RIs, the CPU 210 can determine the dark-range profile and the bright-range profile to reduce the consumption of the K ink. When the smallest amount of remaining chromatic ink RIs is smaller than the remaining amount of K ink RIk, the CPU 210 can determine the dark-range profile and the bright-range profile to reduce the consumption of the chromatic inks.

The dark range, the composite range, and the bright range are examples of a first range, a second range, and a third range, respectively. The dark-range profile, the bright-range profile, and the composite profile are examples of a first profile, a second profile, and a third profile, respectively. The CMY profile PF1 and the CMYK profile PF2 are examples of a first type printing profile and a second type printing profile, respectively. The output value of the dark-range profile (the CMY value as the output value of the CMY profile PF1 in a case where the dark range profile is the CMY profile PF1, for example) is an example of a first output value. The output value of the bright-range profile (the CMYK value as the output value of the CMYK profile PF2 in a case where the bright range profile is the CMYK profile PF2, for example) is an example of a second output value. The composite start luminance Ls and the composite end luminance Le are examples of a first boundary and the second boundary, respectively.

B. Second Embodiment

FIG. 10 is a flowchart illustrating a printing process according to a second embodiment. In the second embodiment, the CPU 210 performs a color conversion process in S40B (FIG. 10), instead of S30 and S40 (FIG. 5) in the printing process in the first embodiment. The printing process according to the second embodiment is otherwise the same as the printing process according to the first embodiment.

FIG. 11 is a flowchart illustrating the color conversion process according to the second embodiment. In S300, the CPU 210 selects a pixel as a target pixel from a plurality of pixels in a target image.

In S305, the CPU 210 determines whether the luminance L of the target pixel is lower than the composite start luminance Ls. Specifically, the CPU 210 obtains, from the measured luminance data LD, a plurality of measured luminances Lm for the respective representative values REV in the vicinity of the RGB value of the target pixel. In other words, the CPU 210 obtains the plurality of measured luminances Lm which corresponds to the representative values REV within a specific range (distance) from the RGB value of the target pixel. Subsequently, the CPU 210 calculates the luminance L of the target pixel by interpolation using the plurality of measured luminances Lm. Then, the CPU 210 determines whether the calculated luminance L is lower than the composite start luminance Ls.

When the luminance L of the target pixel is lower than the composite start luminance Ls (S305: YES), the luminance L of the target pixel falls within the dark range (0≤L<Ls). In S310, the CPU 210 converts the RGB value of the target pixel to a value based on the output values in the dark-range profile. For example, when the dark-range profile is the CMY profile PF1, the CPU 210 obtains, from the CMY profile PF1, a plurality of CMY values which is mapped from the plurality of representative values REV which is in the vicinity of the RGB value of the target pixel, that is, within a prescribed range (distance) from the RGB value of the target pixel. By interpolation using the plurality of obtained CMY values, the CPU 210 calculates the output value so as to be mapped from the RGB value of the target pixel. When the dark-range profile is the CMYK profile PF2, the CPU 210 obtains, from the CMYK profile PF2, a plurality of CMYK values mapped from the plurality of representative values REV which is in the vicinity of the RGB value of the target pixel, that is, within the prescribed range (distance) from the RGB value of the target pixel. By interpolation using the plurality of obtained CMYK values, the CPU 210 calculates the output value corresponding to the RGB value of the target pixel. In this manner, the CPU 210 converts the RGB value of the target pixel to the output value calculated by interpolation.

When in S305 the luminance L of the target pixel is equal to or higher than the composite start luminance Ls (S305: NO), the luminance L of the target pixel is out of the dark range. In this case, the CPU 210 skips S310.

In S315, the CPU 210 determines whether the luminance L of the target pixel is higher than the composite end luminance Le. When the luminance L of the target pixel is higher than the composite end luminance Le (S315: YES), the luminance L of the target pixel falls within the bright range (Le<L). In S320, the CPU 210 converts the RGB value of the target pixel to a value based on a plurality of output values in the bright-range profile. Here, the plurality of output values in the bright-range profile is mapped from the plurality of representative values REV which is in the vicinity of the RGB value of the target pixel, that is, within the prescribed range (distance) from the RGB value of the target pixel. That is, when the bright-range profile is the CMY profile PF1, the CPU 210 performs the above-described interpolation to calculate the output value corresponding to the RGB value of the target pixel by using the output values in the CMY profile PF1. When the dark-range profile is the CMYK profile PF2, the CPU 210 performs the above-described interpolation to calculate the output value corresponding to the RGB value of the target pixel by using the output values in the CMYK profile PF2. In this manner, the CPU 210 converts the RGB value of the target pixel to the output value calculated by interpolation.

When in S315 the luminance L of the target pixel is equal to or lower than the composite end luminance Le (S315: NO), the luminance L of the target pixel is out of the bright range. In this case, the CPU 210 skips S320.

In S325, the CPU 210 determines whether the luminance L of the target pixel is equal to or higher than the composite start luminance Ls and equal to or lower than the composite end luminance Le.

When the luminance L of the target pixel is equal to or higher than the composite start luminance Ls and equal to or lower than the composite end luminance Le (S325: YES), the luminance L of the target pixel falls within the composite range (Ls≤L≤Le). In S330 to S340, the CPU 210 converts the RGB value of the target pixel into a composite output value. The CPU 210 generates the composite output value using a plurality of output values in the bright-range profile and a plurality of output values in the corresponding output value in the dark-range profile. Here, the plurality of output values in the bright-range profile is mapped from the plurality of representative values REV which is in the vicinity of the RGB value of the target pixel, that is, within the prescribed range (distance) from the RGB value of the target pixel, and the plurality of output values in the dark-range profile is mapped from the plurality of representative values REV which is in the vicinity of the RGB value of the target pixel, that is, within the prescribed range (distance) from the RGB value of the target pixel.

In S330, the CPU 210 determines two composite ratios MRs (MR1 and MR2) on the basis of the luminance L corresponding to the target pixel. Specifically, the CPU 210 determines composite ratios MR1 and MR2 using the above described formula (4) similarly to S230 of FIG. 8.

In S335, using the determined composite ratios MR1 and MR2, the CPU 210 calculates the composite output value corresponding to the RGB value of the target pixel. Similarly to S235 in FIG. 8, the CPU 210 uses the formula (5) to determine the composite output value (Co, Mo, Yo, Ko) corresponding to the RGB value of the target pixel. Here, in the second embodiment, the CMYK value (Ca, Ma, Ya, Ka) is the output value of the RGB value of the target pixel and is obtained by the similar interpolation used in S320. The CMYK value (Cb, Mb, Yb, Kb) is also the output value of the RGB value of the target pixel and is obtained by the similar interpolation used in S310.

In S340, the CPU 210 converts the RGB value of the target pixel into the calculated composite output value (Co, Mo, Yo, Ko).

In S345, the CPU 210 determines whether all the pixels in the target image have been processed as the target pixel. When there is any unprocessed pixel (S345: NO), the CPU 210 returns to S300. When all the pixels in the target image have been processed (S345: YES), the CPU 210 ends the color conversion process.

According to the second embodiment, in S40B to S60 (FIG. 10), the CPU 210 performs the print data generation process using the target image data. The print data generation process includes the color conversion process. As illustrated in FIG. 11, the CPU 210 performs the color conversion process using the dark-range profile and the bright-range profile. In the color conversion process, the CPU 210 converts each of the RGB values of the pixels in the target image into the corresponding output value obtained using at least one of the output value in the dark-range profile and the output value in the bright-range profile. When the RGB value of the target pixel is an input value falling within the dark range, in S310 the CPU 210 converts the RGB value of the target pixel into the output value by using the output values mapped from input values in the vicinity of the RGB value within the dark range in the dark-range profile. When the RGB value of the target pixel is an input value falling within the bright range, in S320 the CPU 210 converts the RGB value of the target pixel into the output value by using the output values mapped from input values in the vicinity of the RGB value within the bright range in the bright-range profile. When the RGB value of the target pixel is an input value falling within the composite range, in S330 to S340 the CPU 210 converts the RGB value of the target pixel into the corresponding composite output value. The composite output value is obtained using the output values mapped from input values in the vicinity of the RGB value within the composite range in the dark-range profile and the output values mapped from input values in the vicinity of the RGB value within the composite range in the bright-range profile. The CPU 210 performs the color conversion process using the composite start luminance Ls and the composite end luminance Le, similarly to the profile generation process (FIG. 8) according to the first embodiment. As a result, the CPU 210 can appropriately determine the boundary of the composite range using the output values mapped from the input value in the dark-range profile and the output values mapped from the input value in the bright-range profile. When printing with the different types of inks, the CPU 210 can print an image with sufficient quality using the plurality of profiles, similarly to the first embodiment.

C. Modifications (1) While the print execution device 280 uses four types of inks, the number of types of inks is not limited to four. For example, the print execution device 280 may print using light cyan (LC), light magenta (LM), and light yellow (LY) inks, in addition to the C, M, Y, and K inks. In this case, the CPU 210 may use the CMYK profile and another profile to generate the profile PF3 and perform a color conversion process. The CMYK profile maps the RGB values to the respective CMYK values. The another profile maps each RGB value to an output value including seven component values representing C, M, Y, K, LC, LM, and LY.

Alternatively, the print execution device 280 may be a garment printer. The garment printer prints an image on a fabric using the C, M, Y, K, and white (W) inks. In this case, when printing an image including black on a black fabric, the CPU 210 may use a black-fabric profile and a normal profile to generate the profile PF3 and perform the color conversion process. The black-fabric profile is for expressing black in the image without using the K ink, but by using the black color of the fabric. The normal profile is for expressing black in the image by using the K ink.

Generally speaking, there are various types of print execution devices to print with M types of color materials (M is an integer equal to or greater than 2). When generating a profile and performing a color conversion process, the print execution devices uses a first profile and a second profile. For example, the first profile maps a plurality of input values representing a specific type of color values (e.g., RGB values) to a plurality of first output values. The second profile maps the plurality of input values to a plurality of second output values. Each of the first output values may include N1 component value(s) (N1 is an integer equal to or greater than 1 and equal to or less than M) corresponding to N1 type(s) of color material(s) among the M types of color materials. Each of the second output value may include N2 component value(s) (N2 is an integer equal to or greater than 1 and equal to or less than M) corresponding to N2 type(s) of color material(s) among the M types of color materials.

(2) In the above embodiments, the CPU 210 performs printing using both the CMY profile PF1 and the CMYK profile PF2 to reduce the consumption of the ink having a smallest remaining amount among the black ink and the chromatic inks. Alternatively, the CPU 210 may perform printing using a plurality of profiles for different purposes. For example, some ink may not be suitable to print a specific color, but may be suitable to print a different color. In this case, the CPU 210 uses two different profiles. One profile is used for a specific range including the specific color. This profile includes output values including component values corresponding to the specific ink. The other profile is used for a range outside the specific range. The other profile includes output values that do not include the component values corresponding to the specific ink. When printing, the CPU 210 can use these profiles. Concretely, the K ink may make streaks (banding) more noticeable than the CMY inks when printing an achromatic color in a specific density range. However, the K ink may improve image quality when printing colors other than the achromatic color in the specific density range. To address such characteristic of the K ink, the CPU 210 may use both the CMY profile PF1 and the CMYK profile PF2 for printing. That is, the above-described embodiments can be applied to this case. In a case where the printer 200 is a garment printer for example, resistance to stains and weather may be increased by adjusting the consumption of inks (e.g. reducing a consumption amount of a specific ink or increasing a consumption amount of another specific ink). To improve the resistance to stains and weather, the CPU 210 may also perform printing using both a profile having an output value designating the specific ink and a profile not having an output value designating the specific ink. That is, the above-described embodiments can be applied to this case.

(3) Other examples concerning the garment printer will now be described. The garment printer uses white (W) ink, in addition to C, M, Y, and K inks in printing. The W ink is used to reduce the influence of the color of a fabric F. Specifically, the garment printer performs printing using W ink on the fabric F, and subsequently performs printing using C, M, Y, and K inks on the printed W ink. The color of the fabric F is hardly visible through the printed W ink. So, the W ink reduces influences of the color of the fabric F on the colors of the printed C, M, Y, and K inks. This allows accurate expression of the colors of the input image.

The garment printer stores a normal profile and a black-fabric profile in the non-volatile storage 230. Each of the normal profile and the black-fabric profile is a lookup table mapping each of the plurality of RGB values (input values, for examples, RGB representative values REV) to a corresponding one of a plurality of CMYKW values (output values). In the normal profile, each W value of all the output values (CMYKW values) is other than 0 and falls within a predetermined range between 150 and 255, for example. For example, when the luminance of the input value is at the lowest (the RGB value is (0, 0, 0)), the W value is 150. When the luminance of the input value is at the specific (the RGB value is (255, 255, 255)), the W value is 255. When the luminance of the input value falls between the lowest luminance and the specific luminance, the W value varies depending on the luminance of the input value. Specifically, the higher the luminance of the input value is, the greater the W value is. When the luminance of the input value is higher than the specific luminance, the W value is fixed to 255. Further, each RGB value having a luminance lower than a prescribed luminance are mapped to the CMYKW value having the K value which is other than zero. In other words, in the printing using only the normal profile, the K ink is used when the luminance of RGB value is lower than the prescribed luminance.

The black-fabric profile is for printing when the fabric F has black color. Specifically, the black-fabric profile is used for printing in which black color is represented by using the black color of the fabric F. In the black-fabric profile, the W values of some output values (CMYKW values) are zero. For example, when the input value is the RGB value (0, 0, 0) indicating black (lowest luminance), the RGB value (0, 0, 0) is mapped to the CMYK value (0, 0, 0, 0). Further, each RGB value having a luminance lower than a prescribed luminance are mapped to the CMYKW value having the K and W values of zero. In other words, in the printing using only the black-fabric profile, neither K nor W ink is used when the luminance of RGB value is lower than the prescribed luminance.

FIG. 12A illustrates the printed fabric F using the normal profile. FIG. 12B illustrates the printed fabric F using the black-fabric profile. The fabric F is black in color in FIGS. 12A and 12B. As illustrated in FIG. 12A, when printing black (e.g., RGB value (0, 0, 0)) using the normal profile, the print execution device 280 ejects white ink on the fabric F, and subsequently ejects black ink at the highest density on the printed white ink. When printing gray using the normal profile, the print execution device 280 ejects white ink on the fabric F, and subsequently ejects black ink at a density below the highest density on the printed white ink.

As illustrated in FIG. 12B, when printing black (e.g., RGB value (0, 0, 0)) by using the black-fabric profile, the print execution device 280 does not eject ink at all on the fabric F. When printing gray using the black-fabric profile, the print execution device 280 ejects white ink on the fabric F at a predetermined density. In this manner, the black-fabric profile allows the print execution device 280 to perform printing which expresses black (RGB value (0, 0, 0)) and gray by using the black color of the fabric F. The print execution device 280 consumes less black and white inks when using the black-fabric profile than when using the normal profile.

The garment printer determines the black-fabric profile as the dark-range profile and the normal profile as the bright-range profile when printing is performed on the fabric F having the black color.

The following describes four modifications (3-1), (3-2), (3-3), and (3-4) on how the garment printer determines the composite start luminance Ls (the composite range).

(3-1) The garment printer according to this modification determines the composite start luminance Ls according to the luminance of the fabric F. When the luminance is within a prescribed black range close to and including the lowest luminance, humans visually recognize the color having this luminance as "black". That is, the colors visually recognized as "black" has actually different levels of luminance. For example, a luminance of a first black, a luminance of a threshold black, and a luminance of a second black are included in the prescribed black-color range. The first black has a sufficiently low predetermined luminance. The threshold black has a luminance higher than that of the first black. The second black has a luminance higher than that of the threshold black. When the color of the fabric F is the first black, the garment printer can use the first black of the fabric F to express black (e.g., RGB value (0, 0, 0)) and does not need to eject ink. However, when the color of the fabric F is the second black, the garment printer needs to eject ink to express black (e.g., RGB value (0, 0, 0)). More specifically, when a black color of the fabric F has a luminance which is in the prescribed black range and lower than or equal to the that of the threshold black, the garment printer can use the color of the fabric F to express black (e.g. RGB value (0, 0, 0)) without ejecting the black ink. On the other hand, when a black color in the black range has a luminance which is in the prescribed black range and higher than the that of the threshold black, the garment printer needs to eject ink to express black (e.g., RGB value (0, 0, 0)). In other words, in a conceivable case where the garment printer attempts to express black not by ejecting ink but by using the black of the fabric F whose luminance is higher than that of the threshold black, the garment printer would fail to express black properly. The processes explained in the modifications (3-1)-(3-4) may be performed under a condition that the luminance of the fabric F is in the prescribed black range. According to this modification, the garment printer sets, on the basis of the luminance of the fabric F, the composite range in which both the black-fabric profile and the normal profile are used to determine output values.

Specifically, the garment printer according to this modification determines the composite start luminance Ls using the luminance of the fabric F. That is, the higher the luminance of the fabric F is, the lower the composite start luminance Ls is set to. To measure the luminance of the fabric F, the garment printer may include an optical sensor capable of measuring the luminance of the fabric F. Alternatively, the user may input the luminance of the fabric F into the garment printer. Similarly to S150 (FIG. 6) in the embodiment described above, the garment printer may determine the composite end luminance Le based on the distance between the output value of the normal profile and the output value of the black-fabric profile which are represented in the CMYK color space. Alternatively, the garment printer may determine the composite end luminance Le based on a distance between the output value of the normal profile and the output value of the black-fabric profile which are represented in the CMYKW color space, instead of the distance between the output values represented in the CMYK color space.

As described above, in this modification, the higher the luminance of the fabric F is, the lower the composite start luminance Ls is set to. The lower the composite start luminance Ls is, the narrower the dark range is, thereby making the composite range and the bright range wider. In other words, the lower the composite start luminance Ls is, the wider range the normal profile is used in. Accordingly, the garment printer consumes more white ink. That is, the higher the luminance of the fabric F is, the more white ink the garment printer consumes. This configuration enables the garment printer to express black properly on the fabric F having high luminance. Contrarily, the lower the luminance of the fabric F, the higher the composite start luminance Ls, the less white ink the garment printer consumes. With this configuration, when the luminance of the fabric F is sufficiently low, the garment printer can express black and gray properly with little or no white ink. Further, the garment printer can use the black color of the fabric F to express black and gray without ejecting the black ink. As a result, the garment printer can print with high color reproducibility while reducing the consumption of the black and white inks. The garment printer according to this modification, therefore, can express black and gray properly according to the luminance of the fabric F while reducing the consumption of the black and white inks. In this modification, when the luminance of the fabric F is higher than a prescribed threshold value (for example, the luminance of the threshold black described above), the composite start luminance Ls may be set to zero. That is, the dark region are not set. Or, the black-fabric profile may map the RGB value (0, 0, 0) to the CMYK value having a K value larger than zero. More specifically, the black-fabric profile may map at least one RGB value whose luminance is lower than a prescribed value to a CMYK value having a K value larger than zero. In this case, for the same RGB value as an input value, the K value of the corresponding output value in the black fabric profile is smaller than the K value of the corresponding output value in the normal profile.

(3-2) The garment printer according to this modification determines the composite start luminance Ls according to ink cost. As illustrated in FIG. 13, for example, the garment printer displays a slider SL on the display 240 of the garment printer. The user can specify a desired composite start luminance Ls by moving the slider SL. The garment printer estimates an ink consumption amount based on the specified composite start luminance Ls and calculates the ink cost based on the estimated ink consumption amount. The ink consumption amount indicates the amount of ink ejected when the garment printer prints a reference image using the dark-range profile, the bright-range profile, and the composite profile. Here, the composite profile and the composite end luminance Le are determined similarly to the first embodiment. So, the composite profile is determined using the composite start luminance Ls specified by the user. As the composite start luminance Ls decreases, the garment printer uses the normal profile in a wider range, and consumes the black and white inks more, and the ink cost is increased.

The garment printer displays the calculated ink cost on the display 240. When the displayed cost is acceptable to the user, the user performs a predetermined operation through the display 240 and the operation interface 250 to start printing with the specified composite start luminance Ls. When the displayed cost is not acceptable to the user, the user moves the slider SL again so that the garment printer recalculates the ink cost.

The garment printer according to this modification can perform printing according to the desired ink cost by the user. The garment printer may display a screen in which the user can input a value of the desired composite start luminance Ls instead of displaying the slider SL.

(3-3) The garment printer according to this modification determines the composite start luminance Ls according to washing fastness. The washing fastness indicates the color-fastness of a fabric to washing. An image printed on the fabric F is more likely to crack during washing when the image has been printed with the smaller amount of white ink. That is, the smaller the amount of white ink is used, the lower the washing fastness is. In this modification, the garment printer displays a slider on the display 240 similarly to the modification (3-2). The value specified by the slider indicates an index of the washing fastness. The user can specify the washing fastness by moving the slider. When the user increases the washing fastness, the garment printer lowers the composite start luminance Ls, increasing the consumption of the white ink. In this manner, the garment printer can perform printing according to the washing fastness desired by the user. The garment printer may display a screen in which the user can input a value indicating the desired washing fatness instead of displaying the slider.

(3-4) After the garment printer has printed an image on the fabric F, the user performs a fixing process to fix the printed image on the fabric F. Examples of the fixing process include a heat press method and an oven method. In the heat press method, the printed image is fixed to the fabric F by pressing and heating of the surface of the printed image. In the oven method, the printed image is fixed to the fabric F by heating of the printed image. The image fixed by the oven method tends to have a lower washing fastness than the image fixed by the heat press method. Therefore, when an image is to be fixed by the oven method, white ink is used more in printing than when the image is to be fixed by the heat press method.

The garment printer according to this modification displays, before printing, an input screen for specifying the fixing method. On the input screen displayed on the display 240, the user can select either one of the heat press method or the oven method to be performed. Depending on the selected fixing method, the garment printer determines the composite start luminance Ls. Specifically, when the user selects the oven method, the garment printer specifies the composite start luminance Ls lower than the composite start luminance Ls to be specified for the heat press method. The lower the composite start luminance Ls is, the more white ink the garment printer uses. That is, as the white ink is used more, the washing fastness increases. In this manner, the garment printer can perform printing suitable for the fixing process to be performed by the user.

(4) In the first embodiment, CPU 210 generates the profile PF3 during the printing process. Alternatively, the CPU 210 may generate the profile PF3 at a time different from the printing process. For example, the CPU 210 may update the profile PF3 by executing the process from S15 to S30 (FIG. 5) in a case where the printer 200 is powered on after predetermined interval has passed since a previous generation of the profile PF3, or after a predetermined number of sheets has been printed since a previous generation of the profile PF3.

(5) In the above embodiments, the CPU 210 determines the composite end luminance Le based on the distance D12. The distance D12 indicates a difference between the CMY value and the CMYK value mapped from the same RGB value having a luminance corresponding to (closest to) the composite start luminance Ls. That is, as the distance D12 becomes greater, the composite width MW becomes wider, making the composite end luminance Le higher. Alternatively, the CPU 210 may determine the composite end luminance Le depending on the ratio of at least one of the component values of the CMY value to the corresponding component value of the CMYK value. In this case, as the ratio is closer to 1, the composite width MW becomes narrower, making the composite end luminance Le lower. As the ratio is farther from 1 (e.g. closer to 0), the composite width MW becomes wider, making the composite end luminance Le higher.

(6) In the above embodiments, the CPU 210 determines the composite start luminance Ls based on the smallest amount of remaining chromatic ink RIs and the remaining amount of K ink RIk. Alternatively, the CPU 210 may determine the composite start luminance Ls according to the user instructions. For example, the CPU 210 may display a user interface (UI) screen (not shown) on the display 240. From the UI screen, the CPU 210 may receive the composite start luminance Ls specified by the user. The user interface may include a slider by which the user can specify the composite start luminance Ls, similarly to the slider SL shown in FIG. 13. Alternatively, the composite start luminance Ls may be a predetermined fixed value. In this case, the CPU 210 just needs to obtain the fixed composite start luminance Ls from the non-volatile storage 230.

(7) In the above embodiments, the CPU 210 defines the three ranges (the dark range, the composite range, the bright range) using the composite start luminance Ls and the composite end luminance Le. Alternatively, the CPU 210 may define the three ranges using chroma, hue, or color density. For example, the range of chroma may be divided into an achromatic range ($0 \leq C < Cs$), a chromatic range ($Ce < C$), and a composite range ($Cs \leq C \leq Ce$) by a composite start chroma Cs and a composite end chroma Ce. In this case, when reducing the consumption of the K ink using the profile PF3, the CPU 210 maps the RGB values in the achromatic range to the respective output values in the CMY profile PF1 and maps the RGB values in the chromatic range to the respective output values in the CMYK profile PF2. The CPU 210 maps the RGB values in the composite range to the respective output values obtained based on both the output values in the CMY profile PF1 and the output values in the CMYK profile PF2, similarly to the first embodiment.

(8) In the above embodiments, the CPU 210 identifies the luminance L of each of the RGB values from the measured luminance data LD. Alternatively, the CPU 210 may calculate the luminance L from the component values (R, G, B) of the corresponding RGB value using the following formula (6).

$$L=0.299R+0.587G+0.114B \qquad (6)$$

(9) In the above embodiments, the CMY profile PF1 and the CMYK profile PF2 are prestored in the non-volatile storage 230, and the CPU 210 obtains the CMY profile PF1 and the CMYK profile PF2 from the non-volatile storage 230 during the printing process. Alternatively, the CPU 210 may obtain the CMY profile PF1 and the CMYK profile PF2 from another external device such as a server connected via the network.

(10) In the above embodiments, the printer 200 functioning as the image processing apparatus executes the printing process illustrated in FIG. 5. Alternatively, another type of device, for example, the terminal 100 may execute the printing process. In this case, the terminal 100 functions as a printer driver by executing a driver program and executes the printing process in FIG. 5 as part of the printer driver function. The terminal 100 supplies print data generated in S60 (FIG. 5) to the printer 200, enabling the printer 200 to perform printing.

A server, as an example of the image processing apparatus, may perform the printing process shown in FIG. 5. The server performs image processes by acquiring target image data from the printer 200 or the terminal 100, for example. The server may be a plurality of computers connected to each other via the network. In this case, the plurality of computes as a whole functions as the image processing apparatus.

(10) Part of the configuration of the invention implemented in hardware in the embodiment described above may be replaced by software and, conversely, part of the configuration of the invention implemented in software may be replaced by hardware. For example, a part of processes executed by the CPU 210 of the printer 200 shown in FIG. 1 may be executed by a dedicated hardware circuit.

(11) In the embodiments, each of the profiles PF1-PF3 maps the representative values REV as input values to the output values. Here, the representative values are selected 4913 RGB values among all of the RGB values. However, each of the profiles PF1-PF3 may map all the RGB values to respective output values. Further, the measured luminance data LD may include measured luminance Lm for each of RGB values positioned along the achromatic axis GL.

While the disclosure has been described in detail with reference to the above embodiments, it would be apparent to those skilled in the art that various changes and modifications may be made thereto.

What is claimed is:

1. An image processing apparatus comprising a processor configured to perform:
   acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; and
   generating a third profile mapping a plurality of third input values to respective ones of a plurality of third output values,
   wherein the generating includes:
      acquiring a first boundary defining a first boundary value, the first boundary value being represented in the specific color space; and
      determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value,
   wherein the third profile is generated so that:
      when a specific input value is in the first range, the third profile maps the specific input value to a third output value equal to an output value to which the first profile maps the specific input value;
      when a specific input value is in the third range, the third profile maps the specific input value to a third output value equal to an output value to which the second profile maps the specific input value; and
      when a specific input value is in the second range, the third profile maps the specific input value to a third output value by using an output value to which the first profile maps the specific input value and an output value to which the second profile maps the specific input value.

2. The image processing apparatus according to claim 1, wherein the processor is configured to further perform:
   acquiring target image data representing a target image and including color values represented in the specific color space;
   performing a color conversion process in which the color values in the target image data is converted by using the third profile to generate print data; and
   controlling the print execution device to print an image using the print data.

3. The image processing apparatus according to claim 1, wherein the second boundary is determined so that as a first difference increases, a second difference increases, wherein the first difference is between the first boundary output value and the second boundary output value, and the second difference is between the first boundary and the second boundary.

4. The image processing apparatus according to claim 1, wherein the M types of color material includes a specific type color material,
   wherein when printing is performed by converting color values of image data using the first profile only, a consumption amount of the specific type of color material is different from a consumption amount of the specific type color material when printing is performed by converting the color values of the image data using the second profile only,
   wherein the first boundary is determined on a basis of the consumption amount of the specific type of color material.

5. The image processing apparatus according to claim 1, wherein the M types of color material includes a first type color material and a second type color material,
   wherein the acquiring a first profile and a second profile includes acquiring a first type printing profile and a second type printing profile, the first type printing profile maps a plurality of fourth input values into respective ones of a plurality of fourth output values, the second type printing profile maps a plurality of fifth input values into a plurality of fifth output values,
   wherein in a first case where printing the specific color is performed by converting an input value corresponding to a specific color by using the first type printing profile, a consumption amount of the first type color material is smaller than that of a second case where printing the specific color is performed converting an input value corresponding to the specific color by using the second type printing profile,
   wherein in the first case, a consumption amount of the second type color material is larger than that of the second case,
   wherein the acquiring a first type printing profile and a second type printing profile further includes:
      when a first remaining amount of the first type color material is smaller than a second remaining amount of the second type color material, determining the first type printing profile as the first profile and determining the second type printing profile as the second profile; and when the second remaining amount is smaller than the first remaining amount, determining the first type printing profile as the second profile and determining the second type printing profile as the first profile.

6. The image processing apparatus according to claim 5, wherein the specific color includes black, the first type color material includes black ink, and the second type color material includes cyan ink, magenta ink, and yellow ink,
wherein each of the plurality of fourth output values includes component values for the cyan ink, the magenta ink, and the yellow ink but not including the black ink,
wherein each of the plurality of fifth output values includes component values for the cyan ink, the magenta ink, the yellow ink, and the black ink.

7. The image processing apparatus according to claim 1, wherein the first boundary and the second boundary indicate values of luminance.

8. The image processing apparatus according to claim 1, further comprising a memory stores the first profile and the second profile,
wherein the acquiring a first profile and a second profile acquires the first profile and the second profile from the memory.

9. The image processing apparatus according to claim 1, wherein the processor is configured to further perform:
determining a relevant first input value from among the plurality of first input values, the relevant first input value being one of a first input value equal to the first boundary value or a first input value closest to the first boundary value among the plurality of first input values, the first boundary output value being mapped from the relevant first input value by the first profile; and
determining a relevant second input value from among the plurality of second input values, the relevant second input value being one of a second input value equal to the second boundary value or a second input value closest to the second boundary value among the plurality of the second input values, the second boundary output value being mapped from the relevant second input value by the second profile.

10. An image processing apparatus comprising a processor configured to perform:
acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M;
acquiring target image data including a plurality of color values in the specific color space for representing a target image; and
generating print data based on the target image data by using a color conversion process,
wherein the generating includes:
acquiring a first boundary defining a first boundary value, the first boundary value being represented in the specific color space; and
determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value,
wherein the color conversion process includes:
a first conversion process in which, when a color value is in the first range, the color value is converted to an output value based on a first output value to which the first profile maps a first input value within a prescribed range from the color value;
a second conversion process in which, when a color value is in the third range, the color value is converted to an output value based on a second output value to which the second profile maps a second input value within the prescribed range from the color value; and
a third conversion process in which, when a color value is in the second range, the color value is converted to an output value by using a first output value to which the first profile maps a first input value within the prescribed range from the color value and a second output value to which the second profile maps a second input value within the prescribed range from the color value.

11. The image processing apparatus according to claim 10, wherein the second boundary is determined so that as a first difference increases, a second difference increases, wherein the first difference is between the first boundary output value and the second boundary output value, and the second difference is between the first boundary and the second boundary.

12. The image processing apparatus according to claim 10, wherein the M types of color material includes a specific type color material,
wherein when printing is performed by converting color values of image data using the first profile only, a consumption amount of the specific type of color material is different from a consumption amount of the specific type color material when printing is performed by converting the color values of the image data using the second profile only,
wherein the first boundary is determined on a basis of the consumption amount of the specific type of color material.

13. The image processing apparatus according to claim 10, wherein the M types of color material includes a first type color material and a second type color material, wherein the acquiring a first profile and a second profile includes acquiring a first type printing profile and a second type printing profile, the first type printing profile maps a plurality of fourth input values into respective ones of a plurality of fourth output values, the second type printing profile maps a plurality of fifth input values into a plurality of fifth output values, wherein in a first case where printing the specific color is performed by converting an input value corresponding to a specific color by using the first type printing profile, a consumption amount of the first type color material is smaller than that of a second case where printing the specific color is performed converting an input value corresponding to the specific color by using the second type printing profile, wherein in the first case, a consumption amount of the second type color material is larger than that of the second case, wherein the acquiring a first type printing profile and a second type printing profile further includes:
when a first remaining amount of the first type color material is smaller than a second remaining amount of the second type color material, determining the first type printing profile as the first profile and determining the second type printing profile as the second profile; and
when the second remaining amount is smaller than the first remaining amount, determining the first type printing profile as the second profile and determining the second type printing profile as the first profile.

14. The image processing apparatus according to claim 13, wherein the specific color includes black, the first type color material includes black ink, and the second type color material includes cyan ink, magenta ink, and yellow ink,
wherein each of the plurality of fourth output values includes component values for the cyan ink, the magenta ink, and the yellow ink but not including the black ink,
wherein each of the plurality of fifth output values includes component values for the cyan ink, the magenta ink, the yellow ink, and the black ink.

15. The image processing apparatus according to claim 10, wherein the first boundary and the second boundary indicate values of luminance.

16. The image processing apparatus according to claim 10, further comprising a memory stores the first profile and the second profile,
wherein the acquiring a first profile and a second profile acquires the first profile and the second profile from the memory.

17. The image processing apparatus according to claim 10, wherein the processor is configured to further perform:
determining a relevant first input value from among the plurality of first input values, the relevant first input value being one of a first input value equal to the first boundary value or a first input value closest to the first boundary value among the plurality of first input values, the first boundary output value being mapped from the relevant first input value by the first profile; and
determining a relevant second input value from among the plurality of second input values, the relevant second input value being one of a second input value equal to the second boundary value or a second input value closest to the second boundary value among the plurality of the second input values, the second boundary output value being mapped from the relevant second input value by the second profile.

18. A non-transitory computer readable storage medium storing a set of program instructions for installed on and executed by a computer, the set of program instructions comprising:
acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M; and
generating a third profile mapping a plurality of third input values to respective ones of a plurality of third output values,
wherein the generating includes:
acquiring a first boundary defining a first boundary value, the first boundary value being represented in the specific color space; and
determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value,
wherein the third profile is generated so that:
when a specific input value is in the first range, the third profile maps the specific input value to a third output value equal to an output value to which the first profile maps the specific input value;
when a specific input value is in the third range, the third profile maps the specific input value to a third output value equal to an output value to which the second profile maps the specific input value; and
when a specific input value is in the second range, the third profile maps the specific input value to a third output value by using an output value to which the first profile maps the specific input value and an output value to which the second profile maps the specific input value.

19. A non-transitory computer readable storage medium storing a set of program instructions for installed on and executed by a computer, the set of program instructions comprising:
- acquiring a first profile and a second profile, the first profile mapping a plurality of first input values to respective ones of a plurality of first output values, each of the plurality of first input values being represented in a specific color space, each of the plurality of first output values being represented in a first color space and having N1 component values corresponding to N1 types of color materials among M types of color materials used by a print execution device, M being an integer larger than two, N1 being an integer larger than or equal to one and smaller than or equal to M, the second profile mapping a plurality of second input values to respective ones of a plurality of second output values, each of the plurality of second input values being represented in the specific color space, each of the plurality of second output values being represented in a second color space and having N2 component values corresponding to N2 types of color materials among the M types of color materials, N2 being an integer larger than or equal to one and smaller than or equal to M;
- acquiring target image data including a plurality of color values in the specific color space for representing a target image; and
- generating print data based on the target image data by using a color conversion process,
- wherein the generating includes:
  - acquiring a first boundary defining a first boundary value, the first boundary value being represented in the specific color space; and
  - determining a second boundary by using a first boundary output value and a second boundary output value, the second boundary defining a second boundary value, the second boundary value being represented in the specific color space, the first boundary output value being determined from among the plurality of first output values on a basis of the first boundary, the second boundary output value being determined from among the plurality of second output values on a basis of the first boundary, the first boundary value and the second boundary value defining a first range, a second range, and a third range so that an end of the first range is in contact with an end of the second range at the first boundary value and another end of the second range is in contact with an end of the third range at the second boundary value,
- wherein the color conversion process includes:
  - a first conversion process in which, when a color value is in the first range, the color value is converted to an output value based on a first output value to which the first profile maps a first input value within a prescribed range from the color value;
  - a second conversion process in which, when a color value is in the third range, the color value is converted to an output value based on a second output value to which the second profile maps a second input value within the prescribed range from the color value; and
  - a third conversion process in which, when a color value is in the second range, the color value is converted to an output value by using a first output value to which the first profile maps a first input value within the prescribed range from the color value and a second output value to which the second profile maps a second input value within the prescribed range from the color value.

* * * * *